(12) United States Patent
Sasaski et al.

(10) Patent No.: US 11,521,092 B2
(45) Date of Patent: Dec. 6, 2022

(54) INFERENCE SYSTEM, INFERENCE METHOD, AND RECORDING MEDIUM

(71) Applicant: NEC Corporation, Tokyo (JP)

(72) Inventors: Kentarou Sasaski, Tokyo (JP); Daniel Georg Andrade Silva, Tokyo (JP); Yotaro Watanabe, Tokyo (JP); Kunihiko Sadamasa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 1122 days.

(21) Appl. No.: 16/083,992

(22) PCT Filed: Mar. 9, 2017

(86) PCT No.: PCT/JP2017/009399
§ 371 (c)(1),
(2) Date: Sep. 11, 2018

(87) PCT Pub. No.: WO2017/159523
PCT Pub. Date: Sep. 21, 2017

(65) Prior Publication Data
US 2020/0293929 A1    Sep. 17, 2020

(30) Foreign Application Priority Data
Mar. 15, 2016  (JP) .............................. JP2016-050373

(51) Int. Cl.
*G06F 30/20*       (2020.01)
*G06Q 40/02*       (2012.01)
(Continued)

(52) U.S. Cl.
CPC ............. *G06N 5/045* (2013.01); *G06F 17/18* (2013.01); *G06K 9/626* (2013.01); *G06N 20/00* (2019.01)

(58) Field of Classification Search
CPC ........ G06N 5/045; G06N 20/00; G06N 5/025; G06F 17/18; G06K 9/626
See application file for complete search history.

(56) References Cited

U.S. PATENT DOCUMENTS 8,688,612 B2   4/2014   Lee et al.
8,880,455 B2  11/2014   Kawagishi et al.
(Continued)

FOREIGN PATENT DOCUMENTS

JP    2000-242497 A    9/2000
JP    2010-200840 A    9/2010
(Continued)

OTHER PUBLICATIONS

Lise Getoor et al., "Introduction to Statistical Relational Learning", Adaptive Computation and Machine Learning Series, The MIT Press, Aug. 31, 2007, pp. 291-322, (Kristian Kersting and Luc De Raedt. "10 Bayesian logic programming: Theory and tool") 35 pages total.
(Continued)

*Primary Examiner* — Brandon S Cole
(74) *Attorney, Agent, or Firm* — Sughrue Mion, PLLC

(57) ABSTRACT

An inference method according to the present invention in an inference system inferring a probability that an ending state holds based on a starting state and a rule set, the method includes: when a rule set derived by excluding one rule from rules constituting a first rule set is set as a second rule set, a probability that the ending state holds based on the starting state and the first rule set is set as a first inference result, and a probability that the ending state holds based on the starting state and the second rule set is set as a second inference result, calculating an importance being an indicator indicating magnitude of a difference between the first inference result and the second inference result; and outputting the
(Continued)

rule and the importance of the rule, being associated with each other for each of the excluded rule.

6 Claims, 23 Drawing Sheets

(51) Int. Cl.
  *G06N 5/04* (2006.01)
  *G06N 20/00* (2019.01)
  *G06F 17/18* (2006.01)
  *G06K 9/62* (2022.01)

(56) References Cited

U.S. PATENT DOCUMENTS

| | | | | |
|---|---|---|---|---|
| 2007/0022029 A1* | 1/2007 | Ma | ......................... | G06Q 40/02 705/35 |
| 2010/0070448 A1* | 3/2010 | Omoigui | ........... | H01L 27/14645 706/55 |
| 2013/0297531 A1* | 11/2013 | Becker | .................. | G06Q 40/06 705/36 R |
| 2014/0074764 A1* | 3/2014 | Duftler | .................. | G06N 5/025 706/47 |
| 2014/0278115 A1* | 9/2014 | Bas | ......................... | G01V 1/30 702/14 |
| 2016/0379074 A1* | 12/2016 | Nielsen | ................ | G06K 9/6278 348/143 |
| 2017/0262761 A1* | 9/2017 | Yan | ........................ | G06N 20/00 |
| 2018/0361579 A1* | 12/2018 | Kelly | ....................... | G06F 30/20 |
| 2021/0035026 A1* | 2/2021 | Bansal | .................. | H04L 41/069 |

FOREIGN PATENT DOCUMENTS

| | | |
|---|---|---|
| JP | 2013-8221 A | 1/2013 |
| JP | 2013-511788 A | 4/2013 |

OTHER PUBLICATIONS

Angelika Kimmig et al., "A Short Introduction to Probabilistic Soft Logic", NIPS Workshop on Probabilistic Programming: Foundations and Applications, edition 2, Lake Tahoe, Nevada, USA, Dec. 7-8, 2012 (4 pages total).

Matthew Richardson et al., "Markov Logic Networks", Machine Learning, vol. 62, Issue 1, pp. 107-136, Feb. 2006 (First Online, Jan. 27, 2006), Kluwer Academic Publishers (44 pages total).

International Search Report dated Jun. 13, 2017 issued by the International Searching Authority in counterpart international Application No. PCT/JP2017/009399.

Written Opinion dated Jun. 13, 2017 issued by the International Bureau in counterpart international Application No. PCT/JP2017/009399.

* cited by examiner

Fig.6

| RULE | IMPORTANCE (DIFFERENCE) |
|---|---|
| $F_2$ | 0.35196 |
| $F_3$ | 0.00000 |

Fig.7

| RULE | IMPORTANCE (DIFFERENCE) | WEIGHT |
|---|---|---|
| $F_2$ | 0.35196 | 10 |
| $F_3$ | 0.00000 | 10 |

Fig.8

| Rule | Weight | Logical formula | Remarks |
|---|---|---|---|
| $F_1$ | 10.0 | Run → Burn fat | Run=Observation |
| $F_2$ | 10.0 | Burn fat → Slim | |
| $F_3$ | 10.0 | Burn fat → Starve | |
| $F_4$ | 10.0 | Slim → Get healthy | Get healthy=Query |

US 11,521,092 B2

INFERENCE SYSTEM, INFERENCE METHOD, AND RECORDING MEDIUM

This application is a National Stage Entry of PCT/JP2017/009399 filed on Mar. 9, 2017, which claims priority from Japanese Patent Application 2016-050373 filed on Mar. 15, 2016, the contents of all of which are incorporated herein by reference, in their entirety.

TECHNICAL FIELD

The present invention relates to an inference system, an inference method, and a recording medium that output information related to inference.

BACKGROUND ART

A system executing inference, based on a set of formulae (hereinafter referred to as "rules"), in accordance with a predetermined rule or a criterion is known. Such a system is referred to as an inference system (e.g. see NPL 1).

Early inference systems have used only a formula as a determination criterion in an operation of the system. However, an inference system using not only a deterministic determination criterion such as a formula but also a probabilistic determination criterion at the same time has become available in recent years.

Such a probabilistic inference system defines a random variable based on a rule set and performs probabilistic logical inference. Then, with an observation and a query as inputs, the inference system acquires a posterior probability being a probability that the query holds under the observation and the rule set.

For example, such inference techniques include Probabilistic Soft Logic (hereinafter abbreviated to "PSL," e.g. see NPL 2) and a Markov Logic Network (hereinafter abbreviated to "MLN," e.g. see NPL 3).

CITATION LIST

Patent Literature

PTL 1: Japanese Unexamined Patent Application Publication No. 2013-008221

Non Patent Literature

NPL 1: Lise Getoor and Ben Taskar, "Introduction to Statistical Relational Learning (Adaptive Computation and Machine Learning Series)," The MIT Press, Aug. 31, 2007, pp. 291 to 322 (Kristian Kersting and Luc De Raedt, "10 Bayesian logic programming: Theory and tool")

NPL 2: Angelika Kimmig, Stephen H. Bach, Matthias Broecheler, Bert Huang, and Lise Getoor, "A short introduction to probabilistic soft logic," NIPS Workshop on Probabilistic Programming: Foundations and Applications, edition: 2, Location: Lake Tahoe, Nev., USA, Dec. 7 and 8, 2012

NPL 3: Matthew Richardson and Pedro Domingos, "Markov logic networks. Machine learning," Machine Learning, Volume 62, Issue 1, pp. 107 to 136, February, 2006 (First Online, Jan. 27, 2006), Publisher: Kluwer Academic Publishers

Summary Invention

Technical Problem

The technologies described in NPLs 1 to 3 calculate a posterior probability in that a query holds under an observation and a rule set, based on the rule set, the input observation, and the input query. A "posterior probability in that a query holds under an observation and a rule set" is hereinafter referred to as an "inference result." The technologies described in NPLs 1 to 3 are able to output a calculated inference result itself. However, the technologies described in NPLs 1 to 3 do not output how the inference result is calculated from the rule set and the observation, that is, a process or a basis (reason) of the inference.

However, the inventor of the present invention has found that there is a case, in a situation in which an inference system is used, that it is desirable that the inference system present not only an inference result but also a basis leading to the inference result or a process of the inference.

For example, a case that, when resolving a real-world problem, a user of an inference system uses the inference system in order to support decision making by the user is assumed. In this case, it is preferable for the user that the inference system not only output an inference result itself but also output a basis leading to the inference result or a process of the inference, along with the inference result. The reason is that the user is able to perform decision making based on a deeper insight, by clearly confirming the basis leading to the inference result or the process of the inference, in addition to the inference result. For example, the user becomes capable of determining how reliable the inference result is, based on confirmation of the basis leading to the inference result.

Further, the user is able to learn a state of the inference system at that point of time, based on the presented inference basis. Then, the user is able to grasp an operation of the inference system, considers whether or not a rule and/or a weight used by the inference system is suitable, and, based on the consideration result, improve the inference system. For example, when an unexpected inference result is obtained, the user is able to consider a rule being a basis of the inference. Examples of the consideration in this case are as follows.

Example 1: Influence of an assumed rule is small.
Example 2: A rule taken for granted does not exist.
Example 3: Influence of an unexpected rule is large.

Based on the considerations as described above, the user is able to examine, for example, "whether rules used in the inference system are sufficient as required rules" or "(when a weight exists) whether a weight of a rule is suitable." Then, based on such an examination, the user is able to determine whether or not addition and deletion of a rule to and from the inference system, re-setting of a weight, or the like is necessary.

Thus, by learning a process of inference from an observation to a query, that is, a basis of the inference, a user of an inference system is able to increase findings about a result. The above is a finding obtained by the inventor of the present invention.

However, an internal model and an operation process used in an inference system are often enormous and lack of interpretability. For example, in the case of MLN, every rule appearing in a connected network including an observation and a query influences an inference result. Additionally, the respective rules are related through complicated mathematical expressions as contributions to a probability of the inference result (e.g. see NPL 3).

Furthermore, rules used by a probabilistic inference system include many rules ranging from a rule strongly influencing a result to a rule hardly influencing the result. Accordingly, for example, when "a rule set used in inference" is extracted, the extracted rule set becomes a redundant rule set. Thus, NPLs 1 to 3 have an issue of being incapable of presenting a basis leading to a result.

Specifically, the inventor has found the following new issues with a general inference system.

(1) It is desirable to visualize a basis of inference.
(2) It is desirable to present a basis of inference to a user.
(3) It is desirable to take a basis of inference as a white box.

In other words, NPLs 1 to 3 do not disclose visualizing a basis of inference, presenting the basis to a user, or taking the basis as a white box.

An object of the present invention is to resolve the aforementioned issues and provide an inference system, an inference method, and a recording medium that present a basis of inference.

Solution to Problem

An inference system according to first aspect of the present invention infers a probability that an ending state holds based on a starting state and a rule set. The inference system includes:
 a memory; and
 at least one processor coupled to the memory.
 The processor performing operations.
 The operations includes:
 when a rule set derived by excluding one rule from rules constituting a first rule set is set as a second rule set, a probability that the ending state holds based on the starting state and the first rule set is set as a first inference result, and a probability that the ending state holds based on the starting state and the second rule set is set as a second inference result,
 calculation means that, for each of the excluded rule, calculating an importance being an indicator indicating magnitude of a difference between the first inference result and the second inference result; and
 for each of the excluded rule, outputting the rule and the importance of the rule, being associated with each other.

An inference system according to second aspect of the present invention infers a probability that an ending state holds based on a starting state and a rule set. The inference system includes:
 a memory; and
 at least one processor coupled to the memory.
 The processor performing operations.
 The operations includes:
 when a rule set derived by excluding a third rule set being a subset of a first rule set from rules constituting the first rule set is set as a second rule set, a probability that the ending state holds based on the starting state and the first rule set is set as a first inference result, and a probability that the ending state holds based on the starting state and the second rule set is set as a second inference result,
 with respect to the third rule set, calculating an importance being an indicator indicating magnitude of a difference between the first inference result and the second inference result; and for each of the excluded third rule set, outputting the third rule set and the importance of the third rule set, being associated with each other.

An inference system according to third aspect of the present invention infers a probability that an ending state holds based on a starting state and a rule set. The inference system includes:
 a memory; and
 at least one processor coupled to the memory.
 The processor performing operations.
 The operations includes:
 when a rule set derived by excluding a third rule set being a subset of a first rule set from rules constituting the first rule set is set as a second rule set, a result of inferring a probability that an ending state holds based on a starting state and the first rule set is set as a first inference result, and a result of inferring a probability that an ending state holds based on the starting state and the second rule set is set as a second inference result,
 specifying a rule constituting the second rule set in such a way as to decrease a difference between the first inference result and the second inference result while limiting a quantity of rules constituting the second rule set; and
 outputting the second rule set specified.

An inference system according fourth aspect of the present invention infers a probability that an ending state holds based on a starting state and a rule set. The inference system includes:
 a memory; and
 at least one processor coupled to the memory.
 The processor performing operations.
 The operations includes:
 when a rule set derived by excluding a third rule set being a subset of a first rule set from rules constituting the first rule set is set as a second rule set, a result of inferring a probability that an ending state holds based on the starting state and the first rule set is set as a first inference result, and a result of inferring a probability that an ending state holds based on the starting state and the second rule set is set as a second inference result,
 specifying a rule constituting the third rule set in such a way as to increase a difference between the first inference result and the second inference result while limiting a quantity of rules constituting the third rule set; and
 outputting the third rule set specified.

An inference method according first aspect of the present invention in an inference system infers a probability that an ending state holds based on a starting state and a rule set. The method includes, by the inference system:
 when a rule set derived by excluding one rule from rules constituting a first rule set is set as a second rule set, a probability that the ending state holds based on the starting state and the first rule set is set as a first inference result, and a probability that the ending state holds based on the starting state and the second rule set is set as a second inference result,
 for each of the excluded rule, calculating an importance being an indicator indicating magnitude of a difference between the first inference result and the second inference result; and,
 for each of the excluded rule, outputting the rule and the importance of the rule, being associated with each other.

An inference method according second aspect of the present invention in an inference system infers a probability that an ending state holds based on a starting state and a rule set. The method includes, by the inference system:

when a rule set derived by excluding a third rule set being a subset of a first rule set from rules constituting the first rule set is set as a second rule set, a probability that the ending state holds based on the starting state and the first rule set is set as a first inference result, and a probability that the ending state holds based on the starting state and the second rule set is set as a second inference result, with respect to the third rule set, calculating an importance being an indicator indicating magnitude of a difference between the first inference result and the second inference result; and, for each of the excluded third rule set, outputting the third rule set and the importance of the third rule set, being associated with each other.

An inference method according third aspect of the present invention in an inference system infers a probability that an ending state holds based on a starting state and a rule set. The method includes, by an inference system:

when a rule set derived by excluding a third rule set being a subset of a first rule set from rules constituting the first rule set is set as a second rule set, a result of inferring a probability that an ending state holds based on a starting state and the first rule set is set as a first inference result, and a result of inferring a probability that an ending state holds based on the starting state and the second rule set is set as a second inference result, specifying a rule constituting the second rule set in such a way as to decrease a difference between the first inference result and the second inference result while limiting a quantity of rules constituting the second rule set; and outputting the second rule set specified.

An inference method according to fourth aspect of the present invention in an inference system infers a probability that an ending state holds based on a starting state and a rule set. The method includes, by the inference system:

when a rule set derived by excluding a third rule set being a subset of a first rule set from rules constituting the first rule set is set as a second rule set, a result of inferring a probability that an ending state holds based on the starting state and the first rule set is set as a first inference result, and a result of inferring a probability that an ending state holds based on the starting state and the second rule set is set as a second inference result, specifying a rule constituting the third rule set in such a way as to increase a difference between the first inference result and the second inference result while limiting a quantity of rules constituting the third rule set; and outputting the third rule set specified.

A non-transitory computer-readable recording medium according to first aspect of the present invention embodies a program. The program causes a computer to perform a method in an inference system inferring a probability that an ending state holds based on a starting state and a rule set. The method includes, by the inference system:

when a rule set derived by excluding one rule from rules constituting a first rule set is set as a second rule set, a probability that the ending state holds based on the starting state and the first rule set is set as a first inference result, and a probability that the ending state holds based on the starting state and the second rule set is set as a second inference result, for each of the excluded rule, calculating an importance being an indicator indicating magnitude of a difference between the first inference result and the second inference result; and for each of the excluded rule, outputting the rule and the importance of the rule, being associated with each other.

A non-transitory computer-readable recording medium according to second aspect of the present invention embodies a program. The program causes a computer to perform a method in an inference system inferring a probability that an ending state holds based on a starting state and a rule set. The method includes, by the inference system:

when a rule set derived by excluding a third rule set being a subset of a first rule set from rules constituting the first rule set is set as a second rule set, a probability that the ending state holds based on the starting state and the first rule set is set as a first inference result, and a probability that the ending state holds based on the starting state and the second rule set is set as a second inference result, with respect to the third rule set, calculating an importance being an indicator indicating magnitude of a difference between the first inference result and the second inference result; and for each of the excluded third rule set, outputting the third rule set and the importance of the third rule set, being associated with each other.

A non-transitory computer-readable recording medium according to third aspect of the present invention embodies a program. The program causes a computer to perform a method in an inference system inferring a probability that an ending state holds based on a starting state and a rule set. The method includes, by the inference system:

when a rule set derived by excluding a third rule set being a subset of a first rule set from rules constituting the first rule set is set as a second rule set, a result of inferring a probability that an ending state holds based on a starting state and the first rule set is set as a first inference result, and a result of inferring a probability that an ending state holds based on the starting state and the second rule set is set as a second inference result, specifying a rule constituting the second rule set in such a way as to decrease a difference between the first inference result and the second inference result while limiting a quantity of rules constituting the second rule set; and outputting the second rule set specified.

A non-transitory computer-readable recording medium according to fourth aspect of the present invention embodies a program. The program causes a computer to perform a method in an inference system inferring a probability that an ending state holds based on a starting state and a rule set. The method includes, by the inference system:

when a rule set derived by excluding a third rule set being a subset of a first rule set from rules constituting the first rule set is set as a second rule set, a result of inferring a probability that an ending state holds based on a starting state and the first rule set is set as a first inference result, and a result of inferring a probability that an ending state holds based on the starting state and the second rule set is set as a second inference result, specifying a rule constituting the second rule set in such a way as to decrease a difference between the first inference result and the second inference result while limiting a quantity of rules constituting the second rule set; and outputting the second rule set specified.

Advantageous Effects of Invention

The present invention is able to provide an effect of presenting a basis of inference to a user.

BRIEF DESCRIPTION OF DRAWINGS

FIG. 6 is a diagram illustrating an example of an output associating a rule with an importance.

FIG. 7 is a diagram illustrating an example of an output associating a weight.

FIG. 8 is a diagram illustrating an example of a rule set used in description of a detailed operation.

EXAMPLE EMBODIMENT

Figure 1:
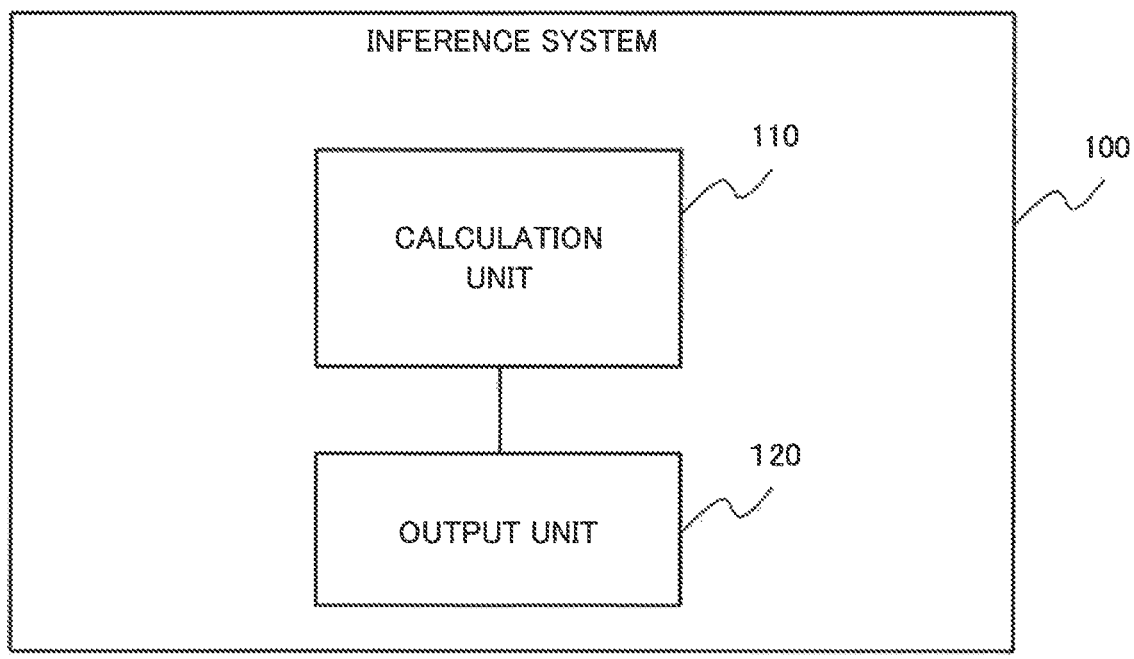
FIG. 1 is a block diagram illustrating a configuration example of an inference system according to a first example embodiment of the present invention.

Next, example embodiments of the present invention will be described with reference to drawings.

Note that the respective drawings are intended for describing the example embodiments of the present invention. However, the present invention is not limited to the descriptions of the respective drawings. Further, an identical numeral is given to similar configurations in the respective drawings, and repeated description thereof may be omitted. Further, in the drawings used in the following description, a configuration unrelated to the description of the present invention may be omitted and unillustrated. Further, a direction of an arrow in a drawing indicates an example and does not limit a signal direction between blocks.

First, terms in the description of the present example embodiment will be summarized.

An "atom" is a formula (an atomic formula or a prime formula) without a sub-formula. An example of an atom is a propositional variable or a predicate. In the following description, a predicate is mainly used as an example of an atom. For example, an example of an atom is "X smokes" with X being a variable. An atom may be expressed by use of a function. For example, the aforementioned "X smokes" may be expressed as "Smoke(X)." Further, an atom may include a plurality of variables. For example, an example of an atom in this case is "X and Y are friends." For example, "X and Y are friends" becomes "Friends(X,Y)" using a function form.

A "ground atom" is an atom derived by substituting a constant for a variable in the atom. For example, an atom derived by substituting a specific person for the variable X in the aforementioned "X smokes" is a ground atom. More specifically, for example, a ground atom in a case that a person A is substituted for the variable X is "A smokes." A truth value (True(1) or False(0)) may be assigned to a ground atom. When A smokes, the ground atom becomes True. When A does not smoke, the ground atom becomes False.

A "world" is an assignment of a truth value to a ground atom. For example, in a case that there are N ground atoms, when an element (each assignment) included in entire assignments of truth values to ground atoms is denoted as "x," x satisfies "$x \in \{0,1\}^N$." Each assignment is referred to as a world(x). In other words, each set of truth values in a ground atom being a result of substituting constants for a predetermined number of variables in an atom is a world.

A "rule" is a formula and is generally a formula including the aforementioned atom. It is assumed that a rule used below is a rule based on predicate logic. Accordingly, a rule may include a predicate. Specifically, a rule is described by use of a proposition, a predicate, a constant, a variable, and a logic symbol ($\forall$, $\exists$, $\neg$, $\wedge$, $\vee$, $\rightarrow$, $\leftarrow$, or $\Leftrightarrow$). A rule used in the example embodiments of the present invention may not be given a weight to be described later. However, since MLN is used as a reference in a description of a detailed operation, to be described later, a rule set composed of weighted rules is used as needed as a rule set in the following description. Further, in the following description, a rule based on first-order predicate logic is used for convenience of description. However, the present invention is not limited to the first-order predicate logic.

Furthermore, the aforementioned logic symbols are symbols used in general predicate logic, and meanings thereof are as follows.

"$\forall$ (referred to as a universal quantifier, a universal quantification symbol, or a universal symbol)" is a logic symbol meaning "for any" or "for all."

"$\exists$ (referred to as an existential quantifier, a particular quantifier, or an existential quantification symbol)" is a logic symbol meaning "there exists . . . satisfying (a condition)" or "for a certain."

"$\neg$" is a logic symbol denoting negation.

"$\wedge$" is a logic symbol denoting conjunction or logical conjunction.

"$\vee$" is a logic symbol denoting disjunction or logical disjunction.

"→" is a logic symbol denoting implication. For example, "A→B" means "if A then B." "A→B" is equivalent to "¬A∨B."

"←" is a logic symbol denoting logic in a converse direction of "→." For example, "A←B" means "if B then A."

"⇔" is a logic symbol denoting equivalence. "A⇔B" is equivalent to "(A→B) A (A←B)."

An "observation" is assignment of truth values to one or more ground atoms. In other words, an observation is a set composed of a pair of a ground atom and a truth value thereof. Then, a truth value is assigned to a ground atom included in an observation. In other words, a truth value is determined with respect to a ground atom included in an observation. "Observing" is an operation of acquiring a ground atom to which a truth value is assigned. Further, an acquisition source of an observation is not particularly limited. For example, an observation may be received from a user or may be received from an unillustrated device or piece of equipment, such as a sensor.

A "query" is a ground atom being a target for which a posterior probability is calculated under an observation and a rule set, or a logical combination of the ground atoms. In other words, a query is a set including at least one ground atom or logical combination of ground atoms as an element. Further, a query is a target of inference in an inference system. Further, an inference system receives a query directly or indirectly from a user.

A "starting state" described in the claims corresponds to an observation. Further, an "ending state" described in the claims corresponds to a query.

A "weight" is a value set to each rule and is a value used as a continuous value for reflecting satisfaction or failure of a rule in a probability. For example, the following is an example using a case of MLN. When there is one rule, a weight of the rule is interpreted as "a logarithm of odds of a probability that a rule holds." The odds in this case are given by "[probability/(1−probability)]." However, such a simple interpretation is generally not known when there are a plurality of rules.

While there is no simple interpretation, in the case of MLN, for example, a weight reflects satisfaction or failure of a rule in a probability of a world as follows.

(1) When a rule with a positive weight holds, a probability of a world becomes higher than when the rule does not hold. In this case, when a rule with a greater absolute value holds, a probability of a world becomes higher than when a rule with a less absolute value holds.

(2) When a rule with a negative weight holds, a probability of a world becomes lower than when the rule does not hold. In this case, when a rule with a greater absolute value holds, a probability of a world becomes lower than when a rule with a less absolute value holds.

(3) A rule with a zero weight does not influence a probability of a world regardless of whether or not the rule holds.

Note that the above applies to a probability of a world. The above is not applied to influence on a probability of a query, and the influence generally cannot be described as simply as the above. The reason is that a probability value of a query is calculated by dividing a value derived by finding the sum of probabilities in a world by a value derived by finding the sum of probabilities in another world, and therefore is generally related in a complicated manner.

As already described, a "weight" is a value disclosed in a known technology such as MLN.

An "importance" of a rule set is an indicator indicating the degree of contribution to an inference result by the rule set. The "importance" of a rule set is an indicator newly found by the inventor of the present invention.

An importance of a rule set according to the present invention is defined as follows.

(Premise 1) A case of inferring a posterior probability that a query holds based on an observation and a rule set is assumed.

(Premise 2) A rule set derived by excluding a certain rule set from rules constituting a first rule set is set as a second rule set.

(Premise 3) A probability that a query holds based on the observation and the first rule set is set as a first inference result.

(Premise 4) A probability that the same query as above holds based on the same observation as above and the second rule set is set as a second inference result.

At this time, an importance of the excluded rule set is defined as follows.

(Definition) An importance of an excluded rule set is defined based on magnitude of a difference between a first inference result and a second inference result.

An "importance" is able to be defined for a single rule and to be defined for a rule set.

As described above, an "importance" according to the present invention is a different concept from the aforementioned "weight."

For example, it is assumed that a first rule set is a rule set including 100 rules. It is further assumed that ten rules out of the 100 rules constituting the first rule set are randomly selected, and the selected rules are excluded from the first rule set. Consequently, a second rule set including 90 rules is defined.

A probability of a query inferred under an observation and the first rule set is set as a first inference result. A probability of the same query as above inferred under the same observation as above and the second rule set is set as a second inference result. An importance of the ten rule sets excluded earlier is defined by use of magnitude of a difference between the first inference result and the second inference result.

For example, it is assumed that, when certain ten rules (hereinafter referred to as a "third rule set part 1") are excluded, the difference between the first inference result and the second inference result is not so large. It is further assumed that, when ten rules other than the third rule set part 1 (hereinafter referred to as a "third rule set part 2") are excluded, the difference between the first inference result and the second inference result is remarkably large. At this time, an importance of the third rule set part 2 is higher than an importance of the third rule set part 1.

The aforementioned specific example of an importance may be reworded as follows, focusing on the second rule set.

Rules remaining after excluding certain ten rules (a third rule set part 1) from the aforementioned first rule set is set as a second rule set part 1, and a probability of the same query as above inferred under the same observation as above and the second rule set part 1 is set as a second inference result part 1. Rules remaining after excluding ten other rules (a third rule set part 2) from the aforementioned first rule set is set as a second rule set part 2, and a probability of the same query as above inferred under the same observation as above and the second rule set part 2 is set as a second inference result part 2.

When a difference between the first inference result and the second inference result part 2 is less than a difference between the first inference result and the second inference result part 1, an importance of the second rule set part 2 is higher than an importance of the second rule set part 1. The reason is that an inference result based on the second rule set part 2 is considered to more accurately reproduce the first inference result than an inference result based on the second rule set part 1.

In the following description, a wording "equal to or more than" or a wording "equal to or less than" may be used as a comparison between a value and a threshold value. The wording "equal to or more than" may read as "more than." Further, the wording "equal to or less than" may read as "less than."

DESCRIPTION OF SYMBOLS

Symbols used in the following description will be described.

Card(S) denotes a function representing a number of elements (elements) of a set S.

[[1]] denotes an interpretation of a formula 1. In this case, since first-order predicate logic is used, an interpretation is either "True" or "False." When an interpretation is expressed by use of a value, it is hereinafter assumed that True=1 and False=0.

A denotes a predicate.

F denotes a grounded rule, that is, a rule in which a value of a variable is determined. When rules F are to be distinguished, an index j is added.

L denotes an entire set of rules F (hereinafter referred to as a rule set). A subset of a rule set L remaining after excluding one or more rules F from the rule set L is denoted as a rule subset L'(L' c L). Further, a set of the one or more excluded rules F is denoted as a rule subset L".

For example, it is assumed that a rule set L is a rule set including 100 rules F. It is further assumed that ten rules F out of the 100 rules F constituting the rule set L are randomly selected, and the selected rules F are excluded from the rule set L. In this case, a rule set including the remaining 90 rules F is a rule subset L'. Further, a set of the ten excluded rules F is a rule subset L". The rule subset L" may also be referred to as an "excluded rule subset L'"" in order to clarify the exclusion.

For example, when a number of elements of a rule set L (Card(L)) is denoted as N, the rule set L becomes $\{F_1, F_2, \ldots, F_N\}$.

O denotes an observation. An observation O is a set of a pair of a ground atom and a truth value thereof. The following description is made on an assumption that O is not empty.

Q denotes a query. A query Q includes at least one ground atom or logical combination of ground atoms.

Specific examples of an observation O and a query Q will be presented.

For example, when a number of elements included in an observation O (Card(O)) is denoted as M, the observation O becomes $\{[[A_1]]=\text{True}, \ldots, [[A_M]]=\text{True}\}$. Thus, a truth value is determined for an element constituting the observation O.

Further, for example, it is assumed that a number of elements included in a query Q is denoted as K. Then, the query Q becomes $\{A_1, A_2, \ldots, A_K\}$.

P(Q|O,L) denotes a probability of a query Q under a rule set L and an observation O. The probability is simply referred to as a probability P(Q|O,L) in the following description.

$D_L(L',O,Q)$ denotes an amount of change between a probability P(Q|O,L') of a query Q in inference using a rule subset L' under an observation O and a probability P(Q|O,L) of the query Q in inference using a rule set L. An expression of $D_L(L',O,Q)$ by use of a mathematical expression is as follows.

$$D_L(L',O,Q)=P(Q|O,L')-P(Q|O,L)$$

In other words, $D_L(L',O,Q)$ is an example of a difference. Accordingly, $D_L(L',O,Q)$ is hereinafter used as a difference. Note that a value of a difference is a positive value, a negative value, or zero. However, "magnitude of a difference" is assumed to be magnitude of an absolute value of the difference value. For example, in the following description, a "difference $D_L(L',O,Q)=-0.5$" is described to be greater than a "difference $D_L(L',O,Q)=0.3$."

Further, w denotes a weight given to a rule.

<Invention Related to Present Invention>

Prior to description of a first example embodiment of the present invention, an example of using a "weight" set to a rule as an indicator indicating the degree of contribution to an inference result by the rule will be described. The following description is also a finding found by the inventor of the present invention. An invention using a "weight" set to a rule as an indicator indicating the degree of contribution to an inference result by the rule is hereinafter referred to as a "related invention."

An inference system using MLN or the like sets a weight w to a rule F. Accordingly, an invention outputting a basis of inference, based on a weight w, will be described as a related invention of the present invention.

As described above, an inference system such as MLN gives a weight w to a rule F. In the following description, a pair of a weight w and a rule F is referred to as a "weighted rule." Further, in the following description, a rule including a weighted rule is also referred to as a rule F unless distinction is particularly necessary.

In MLN or the like, a weight w takes a real value, ∞, or −∞. Note that ∞ is a symbol representing a value greater than any real value. Further, −∞ is a symbol representing a value less than any real value.

The related invention extracts a rule subset L' from a rule set L by use of a weight w as a selection criterion, as a basis for describing an inference result.

More specifically, the related invention operates as follows.

First, the related invention acquires a rule set L and a hyper-parameter. For example, the related invention receives a rule set L and a hyper-parameter from a device operated by a user. The rule set L includes the aforementioned weight w. The hyper-parameter will be described later.

The related invention selects a rule F based on a weight w of the rule F, and outputs a rule subset L'.

For example, selection techniques in the related invention include the following two methods. The related invention may further include a constraint. An example of the constraint is "a rule F including an observation O and/or a rule F including a query Q is not excluded."

(First selection method) A first method is a method of selecting a rule F with a value of a weight w being equal to or more than a threshold value. In the case of the method, the related invention acquires the threshold value of a weight w as the aforementioned hyper-parameter. In other words, the first selection method is a selection method of excluding a rule F with a value of a weight w being less than the threshold value. An output in the first method is a rule subset L' composed of a rule F with a weight w being equal to or more than the hyper-parameter.

(Second selection method) A second method is a method of selecting a predetermined number of rules F in descending order of values of weights w. In the case of the method, the related invention acquires a number of rules F as a hyper-parameter. In other words, the second selection method is a selection method of excluding rules F in ascending order of weights w in such a way as to keep the predetermined number of rules F. An output in the second method is a rule subset L' including rules F the number of which is specified in descending order of weights w by use of the hyper-parameter.

The related invention outputs a rule subset L' by use of either of the aforementioned methods. The rule subset L' selected as an output is a subset of rules F with a larger weight w. Accordingly, the output rule subset L' is a rule F suitable for use in inference.

Furthermore, the related invention may use both of the aforementioned methods. Specifically, the related invention may acquire the aforementioned threshold value of a value of a weight w (first threshold value) and the aforementioned threshold value of a number of rules F (second threshold value). Then, the related invention may select rules F by use of "delete every rule F less than the first threshold value" and/or "the number of rules F is equal to or less than the second threshold value rule" as a stop condition.

(Issues with Related Invention)

As described above, the related invention is able to output a rule subset L' as a basis of inference.

However, inference a basis of which is to be actually presented is inference for finding "a probability P of a query Q under an observation O."

Accordingly, the inventor has found the following issues in presenting a basis of inference for finding a probability P of a query Q under an observation O in the related invention.

A first issue is that, in the related invention, an influence on "a probability P of a query Q under an observation O" is not considered in a rule subset L' selected as an output.

The reason is as follows. In the related invention, a weight w used as a criterion for selection is a value determined in a stage preceding an operation of inferring "a probability P of a query Q under an observation O." For example, the weight w is determined based on a result of weight learning processing using machine learning or a user definition, prior to a rule set L being used as an input to the inference system. In other words, selection based on the weight w does not use information about the observation O and information about the query Q in an inference stage, in the selection of a rule F. Thus, the related invention does not consider an influence on "the probability P of the query Q under the observation O."

A second issue is that, in the related invention, a range in which a probability P in a case of re-inference by use of a rule subset L' selected as an output varies with respect to a probability P in a case of inference by use of an original rule set L cannot be guaranteed.

The reason is that, similarly to the issue 1, the related invention does not use information about an observation O and information about a query Q in inference, in selection of a rule F. Since a weight w being used as a criterion of selection by the related invention is a value determined in a stage preceding inference, the related invention does not consider information about the observation O and information about the query Q in inference. Accordingly, the related invention is not able to guarantee a range in which a probability of the query Q under the observation O varies.

A third issue is that the related invention is not able to use a probabilistic inference system handling a rule F without a weight w.

The reason is that the related invention uses a weight w as a criterion for selection of a rule F.

For example, according to NPL 1, a weight w is not given to a rule F. Accordingly, the related invention is not able to select a rule F in an inference system using NPL 1.

A fourth issue is that the related invention is not able to handle a rule set.

The reason is that a weight w handled by the related invention is set for each rule F.

Accordingly, the inventor has found an information processing system resolving the aforementioned issues, as described below.

First Example Embodiment

An inference system 100 according to a first example embodiment of the present invention will be described below with reference to drawings.

The inference system 100 infers a probability P that a query Q holds under an observation O and a rule set L. Then, the inference system 100 outputs a basis of the inference. An example of a basis of inference is a rule F excluded when a rule subset L' is generated from the rule set L. In other words, an example of the inference system 100 outputs, as "a basis of inference", a rule F excluded when the rule subset L' for calculating the probability P of the query Q under the rule set L and the observation O is generated.

First, an outline of an operation of the inference system 100 will be described with reference to drawings.

Figure 4:
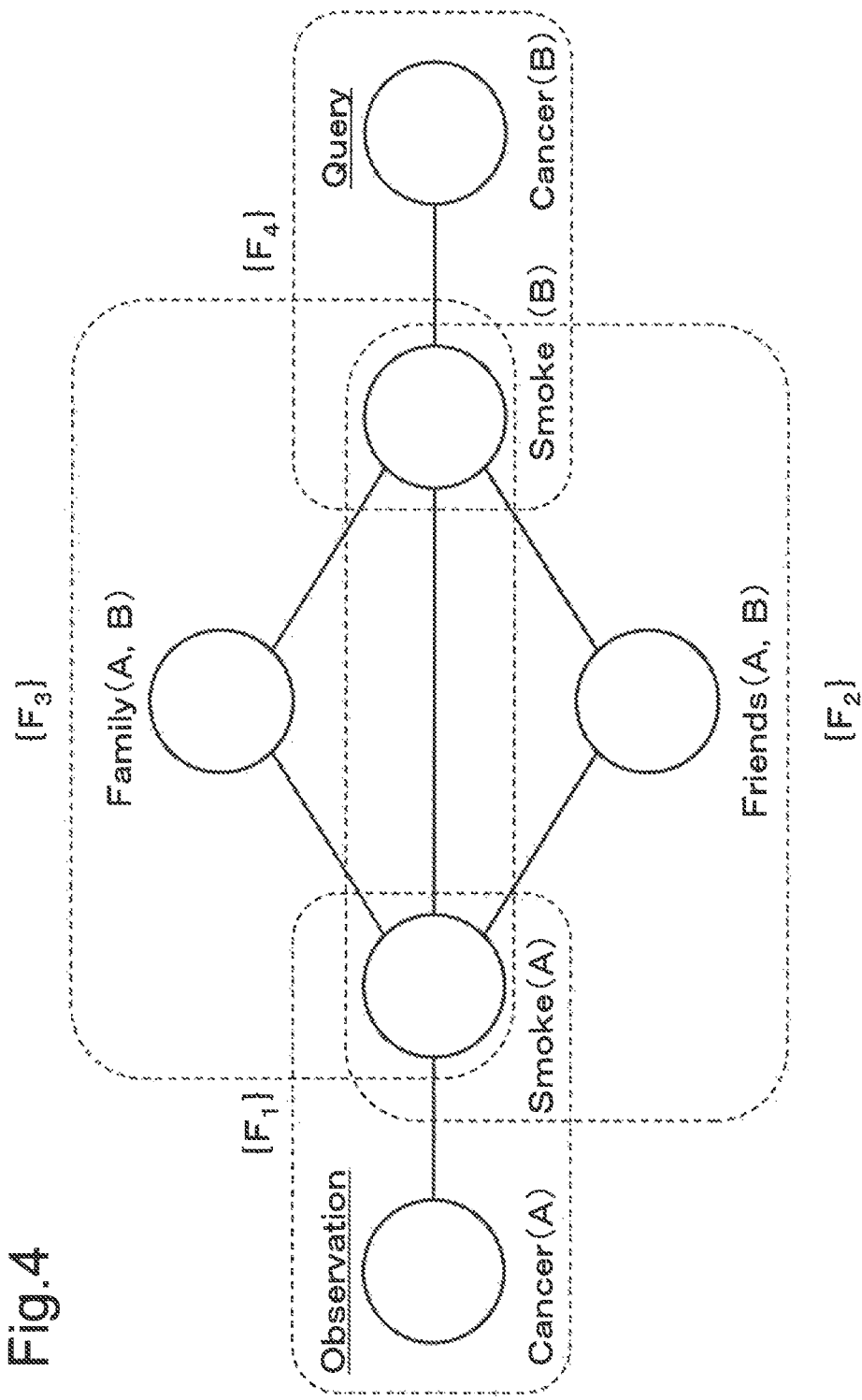
FIG. 4 is a diagram illustrating a rule set used for describing an outline of an operation according to the first example embodiment.

FIG. 4 is a diagram illustrating a rule set L used for describing an outline of the operation according to the first example embodiment. The graph illustrated in FIG. 4 is, for example, a graph generated by applying the following technique.

(1) A ground atom is set as a node.
(2) With respect to a pair of ground atoms, an edge is drawn between two ground atoms only when the two ground atoms appear in the same rule.

The technique is a technique used in MLN and the like. Further, FIG. 4 is an undirected graph. In other words, an inference direction in each rule F in FIG. 4 is not necessarily limited to from left to right.

In FIG. 4, "Cancer(X)" indicates "X gets cancer." "Smoke (X)" indicates "X smokes." "Family(X,Y)" indicates "X and Y are family members." "Friends(X,Y)" indicates "X and Y are friends."

Then, an observation O is assumed to be True for "A gets cancer." A query Q is assumed to be "B gets cancer."

In other words, FIG. 4 illustrates a rule set L being an example of an entire basis of inference when finding a probability P that "B gets cancer" being the query Q under the observation O being True for "A gets cancer."

Rules F included in the rule set L illustrated in FIG. 4 are as follows.

$F_1$=A smokes→A gets cancer
$F_2$=A smokes∧A and B are friends→B smokes
$F_3$=A smokes∧A and B are family members→B smokes
$F_4$=B smokes→B gets cancer First, the inference system 100 calculates a probability of the query Q under the rule set L and the observation O. The probability at this time is set as a first inference result.

Then, the inference system 100 calculates a probability of the query Q under a rule subset L' derived by excluding any of the rules F, and the observation O.

For example, it is assumed that the inference system 100 excludes the rule $F_3$.

Figure 5:
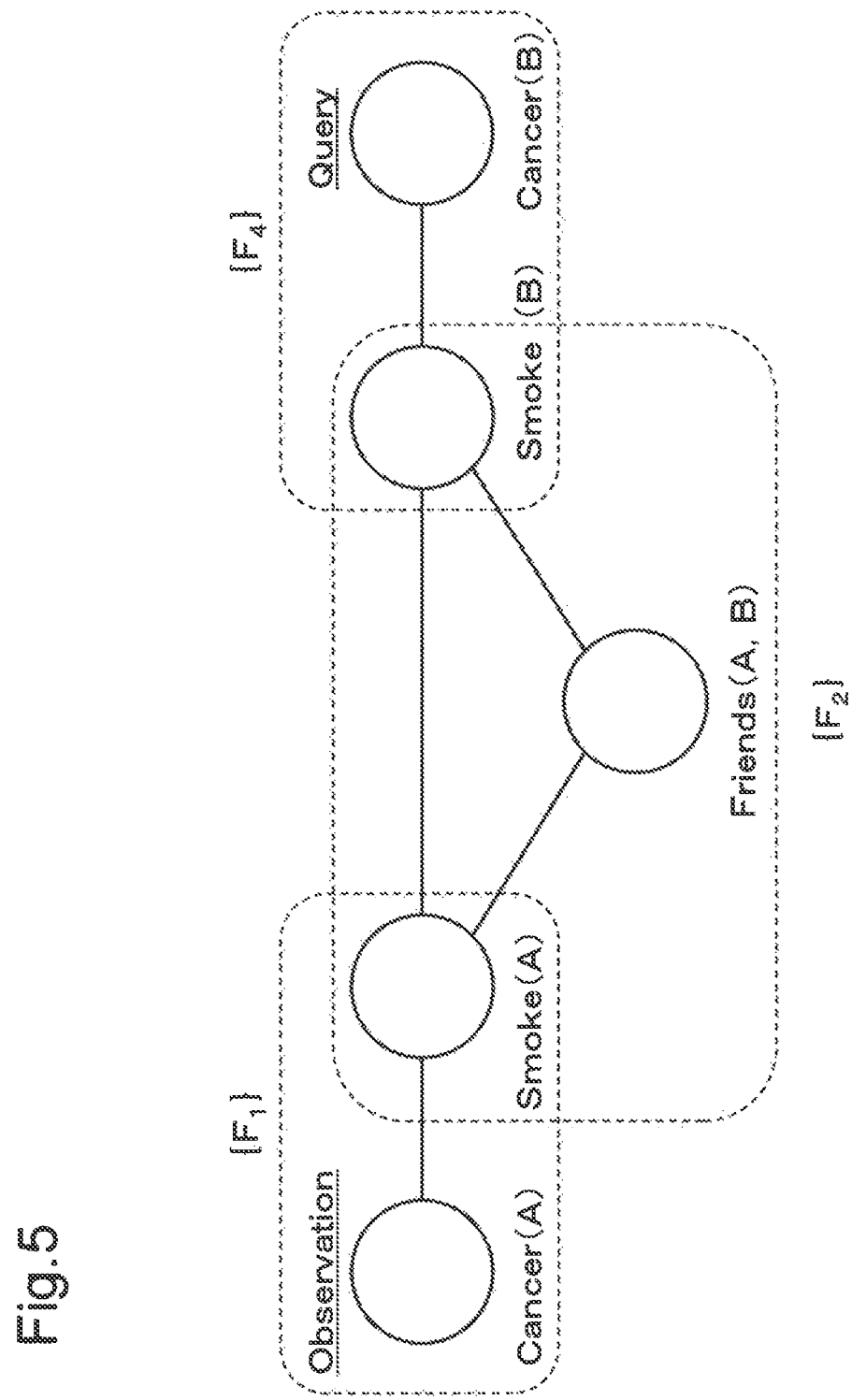
FIG. 5 is a diagram illustrating an example of a rule subset derived by excluding a rule in the rule set in FIG. 4.

FIG. 5 is a diagram illustrating an example of a rule subset L' derived by excluding the rule $F_3$ in the rule set in FIG. 4. The rule subset L' illustrated in FIG. 5 is composed of the following rules F.

$F_1$=A smokes→A gets cancer
$F_2$=A smokes\/A and B are friends→B smokes
$F_4$=B smokes→B gets cancer The inference system 100 calculates a probability of the query Q under the observation O and the rule subset L'. The probability at this time is set as a second inference result.

Then, the inference system 100 calculates a difference between the first inference result and the second inference result as an importance of the excluded rule F.

Then, the inference system 100 outputs the excluded rule F and the importance of the rule F, the two being associated with one another.

Consequently, a user is able to specify a rule F with a higher importance.

For example, when an importance of the rule $F_2$ is higher than an importance of the rule $F_3$, a user learns that a rule subset L'$\{F_1,F_2,F_4\}$ is more suitable than a rule subset L'$\{F_1,F_3,F_4\}$ as a basis.

Next, a configuration of the inference system 100 according to the first example embodiment will be described with reference to drawings.

FIG. 1 is a block diagram illustrating a configuration example of the inference system 100 according to the first example embodiment of the present invention.

The inference system 100 infers a probability that an ending state holds based on a starting state and a rule set L.

For that purpose, the inference system 100 includes a calculation unit 110 and an output unit 120.

The calculation unit 110 sets a rule set derived by excluding one rule from rules constituting a first rule set as a second rule set. Then, the calculation unit 110 calculates, as a first inference result, a probability that an ending state holds based on a starting state and the first rule set. Additionally, the calculation unit 110 calculates, as a second inference result, a probability that the same ending state as above holds based on the same starting state as above and the second rule set. Then, for each excluded rule, the calculation unit 110 calculates an importance being an indicator indicating magnitude of a difference between the first inference result and the second inference result.

The output unit 120 outputs a rule and an importance of the rule, the two being associated with one another, for each excluded rule.

The output unit 120 may output a rule with a higher importance in preference to a rule with a lower importance.

In the description above, the starting state is an observation O. The first rule set is a rule set L. The ending state is a query Q. The first inference result is a probability P(Q|O, L) of the query Q under the observation O and the rule set L. The second rule set is a rule subset L'. Consequently, the second inference result is a probability P(Q|O,L') of the query Q under the observation O and the rule subset L'. Then, the example of a difference is $D_L$(L',O,Q).

In other words, the calculation unit 110 calculates, as a first inference result, a probability P(Q|O,L) that the query Q holds under the observation O and the rule set L. Additionally, the calculation unit 110 generates, as a second rule set, a rule subset L' derived by excluding one rule from the rule set L. Then, the calculation unit 110 calculates, as a second inference result, a probability P(Q|O,L') that the query Q holds under the observation O and the rule subset L'. Then, the calculation unit 110 calculates $D_L$(L',O,Q) as an importance.

Then, the output unit 120 outputs the excluded rule F and an importance of the rule F, the two being associated with one another.

FIG. 6 is a diagram illustrating an example of an output associating a rule F with an importance thereof. FIG. 6 illustrates a case that rules F are arranged in descending order of importance. Note that the rule $F_1$ including the observation O and the rule $F_4$ including the query Q are omitted in FIG. 6.

An output destination of an output of the output unit 120 is not particularly limited. The output unit 120 may transmit a rule F and an importance to an unillustrated device operated by a user. Alternatively, the output unit 120 may include unillustrated display equipment and cause the display equipment to display a rule F and an importance.

The inference system 100 may repeat a similar operation by setting the rule subset L' as a new rule set L.

An acquisition source of information for the inference system 100 is not particularly limited. For example, the calculation unit 110 may acquire an observation O, a query Q, and a rule set L from an unillustrated external device. Alternatively, the calculation unit 110 may operate by use of an observation O, a query Q, and a rule set L that are previously held in an unillustrated storage device.

In the description above, the calculation unit 110 has been described to execute inference when calculating an importance. The inference in this case is to calculate a probability P with a query Q. However, a configuration executing inference is not limited to the calculation unit 110. For example, an unillustrated inference engine (e.g. an inference engine similar to MLN) may calculate the aforementioned probability P. In this case, the calculation unit 110 may transmit "a rule set L, a rule subset L', an observation O, and a query Q" to the inference engine and acquire an inference result (probability P) from the inference engine.

The thus configured inference system 100 is able to provide an effect of presenting a basis of inference to a user.

The reason is as follows.

The calculation unit 110 calculates a difference between probabilities P of the query Q when excluding a rule F. In other words, the calculation unit 110 calculates an importance of the rule F. Then, the output unit 120 outputs the rule F and the calculated importance of the rule F, the two being associated with one another. Based on such an operation, the inference system 100 is able to present to a user a rule F having a higher degree of influence on the probability P of the query Q (a rule F with a higher importance).

Furthermore, the inference system 100 provides an effect of resolving the issues of the related invention.

The reason is as follows.

The calculation unit 110 calculate, as an importance of a rule F, a difference between a probability P of a query Q under a rule subset L' derived by excluding the rule F and an observation O, and a probability P of the query Q under a rule set L and the observation O. In other words, the calculated importance of the rule F is a value indicating a degree of the rule F influencing the probability P of the query Q under the observation O. That is to say, the calculation unit 110 calculates, as an importance, a degree of influence on "the probability P of the query Q under the observation O." Then, the output unit 120 outputs the rule F and the importance, the two being associated with one another. Consequently, the inference system 100 considers a degree of influence (importance) on "the probability P of the query Q under the observation O." In other words, the inference system 100 resolves the first issue of the related invention.

Further, the calculation unit 110 calculates, as an importance, a difference between probabilities P with a rule set L and a rule subset L'. Then, the output unit 120 outputs a rule F and an importance thereof, the two being associated with one another. Accordingly, based on the importance, the inference system 100 is able to guarantee a range of variation with respect to a probability P in inference using the rule set L. In other words, the inference system 100 resolves the second issue of the related invention.

Furthermore, the calculation unit 110 does not use a weight in calculation of an importance of a rule F. Accordingly, the calculation unit 110 is able to support a probabilistic inference system without weighting. In other words, the inference system 100 resolves the third issue of the related invention.

Modified Example 1

When a weight w is included in a rule set L, the calculation unit 110 in the inference system 100 may output the weight w in addition to a difference in specification of a rule F, the three being associated with one another.

FIG. 7 is a diagram illustrating an example of an output associating a weight. FIG. 7 illustrates a case of arranging rules F in descending order of importance. Note that the rule $F_1$ including the observation O and the rule $F_4$ including the query Q are omitted in FIG. 7.

However, the inference system 100 may arrange the rules F, based on a different item. For example, the inference system 100 may arrange the rules F in descending order of weights of the rules F. In this case, a user is able to acquire a different finding in inference such as a rule F with a high weight and a low importance.

Thus, the output unit 120 may output a rule F, an importance of the rule F, and a weight value previously calculated for the rule F, the three being associated with one another.

Modified Example 2

The inference system 100 may use a constraint. For example, the inference system 100 may use a constraint that "a rule F including an observation O and/or a rule F including a query Q is not excluded." Alternatively, the inference system 100 may receive from a user an instruction about a rule F not to be excluded. Alternatively, the inference system 100 may not exclude a rule F within a predetermined range from an observation O or a query Q. Alternatively, when an observation O includes time information, the inference system 100 may set a range of excludable observations O by use of time.

Modified Example 3

In the description so far, a difference $D_L(L',O,Q)$ is described as a difference between probabilities P of a rule set L and a rule subset L'. However, the difference $D_L(L',O,Q)$ is not limited to such a difference between probabilities P. For example, the calculation unit 110 may use a difference of the differences $D_L(L',O,Q)$. The difference in this case refers to a difference related to a rule F included in a rule subset L' in a probability P. For example, the difference is a difference of a probability P in whether or not a rule F is included in a rule subset L'. An example of the difference in this case will be presented below.

The calculation unit 110 may use a difference $[D_{L'}(L'\backslash F_j, O,Q)]$ expressed in Equation 1 in place of the difference $D_L(L',O,Q)$. Note that "\" in Equation 1 denotes exclusion of a rule. Specifically, "a rule subset $L'\backslash F_j$" indicates further excluding a rule $F_j$ from a rule subset L'. Then, the difference $D_{L'}(L'\backslash F_j, O,Q)$ represents a difference between the difference $D_L(L',O,Q)$ and a difference $D_L(L'\backslash F_j, O,Q)$. In other words, Equation 1 expresses that the difference $[D_{L'}(L'\backslash F_j, O,Q)]$ is an amount of change of the difference $D_L$ when the rule $F_3$ is excluded from the rule subset L'. The calculation unit 110 may use the $D_L(L'\backslash F_j, O,Q)$ in place of the difference $D_L(L',O,Q)$.

$$D_{L'}(L'\backslash F_j, O, Q) = D_L(L'\backslash F_j, O, Q) - D_L(L', O, Q) \quad \text{[Equation 1]}$$
$$= (P(Q|O, L'\backslash F_j) - P(Q|O, L)) -$$
$$(P(Q|O, L') - P(Q|O, L))$$
$$= P(Q|O, L'\backslash F_j) - P(Q|O, L')$$

Second Example Embodiment

The inference system 100 according to the first example embodiment excludes one rule F at a time.

However, the inference system 100 may exclude a plurality of rules F, that is, a rule set, at a time.

Then, as a second example embodiment, an inference system 100 excluding from a rule set L a plurality of rules F, that is, a rule set, will be described.

Compared with the first example embodiment, the inference system 100 according to the second example embodiment is similar except that a rule set is excluded, and therefore detailed description of a configuration is omitted as appropriate. Further, description of an operation similar to that according to the first example embodiment is also omitted, and an operation unique to the present example embodiment will be described.

The inference system 100 according to the second example embodiment infers a probability that an ending state holds based on a starting state and a rule set.

Then, the inference system 100 includes a calculation unit 110 and an output unit 120.

The calculation unit 110 according to the second example embodiment sets, as a second rule set, a rule set derived by excluding a third rule set being a subset of a first rule set from rules constituting the first rule set. Then, the calculation unit 110 sets, as a first inference result, a probability that the same ending state as above holds based on the same starting state as above and the first rule set. Then, the calculation unit 110 sets, as a second inference result, a probability that the same ending state as above holds based on the same starting state as above and the second rule set. Then, with respect to the third rule set, the calculation unit 110 calculates an importance being an indicator indicating magnitude of a difference between the first inference result and the second inference result.

The output unit 120 outputs a third rule set and an importance of the third rule set, the two being associated with one another, for each excluded third rule set.

The inference system 100 according to the second example embodiment may repeat the operation described above.

Further, the inference system 100 according to the second example embodiment may use the modified examples 1 to 3 according to the first example embodiment.

Thus, in addition to the effects provided by the first example embodiment, the inference system 100 according to the second example embodiment provides an effect of being capable of calculating an importance of a set of a plurality of rules F.

The reason is that the calculation unit 110 according to the second example embodiment calculates an importance for a rule set including a plurality of rules F. That is to say, the inference system 100 according to the second example embodiment is able to calculate an importance for a plurality of rules F. In other words, the inference system 100 according to the second example embodiment resolves the fourth issue of the related invention.

Third Example Embodiment

Next, a third example embodiment of the present invention will be described.

Figure 2:
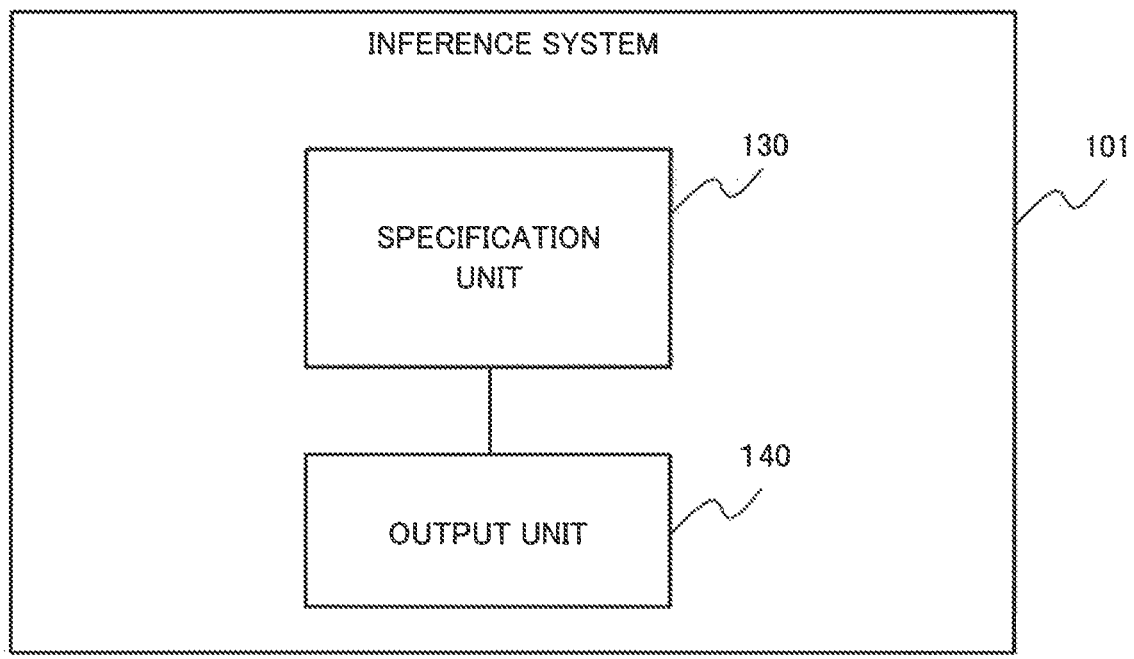
FIG. 2 is a block diagram illustrating a configuration example of an inference system according to a third example embodiment.

FIG. 2 is a block diagram illustrating a configuration example of an inference system 101 according to the third example embodiment. The inference system 101 includes a specification unit 130 and an output unit 140.

The specification unit 130 sets, as a second rule set, a rule set derived by excluding a third rule set being a subset of a first rule set from rules constituting the first rule set. Then, the specification unit 130 sets, as a first inference result, a result of inferring a probability that an ending state holds based on a starting state and the first rule set. Then, the specification unit 130 sets, as a second inference result, a result of inferring a probability that the same ending state as above holds based on the same starting state as above and the second rule set. Then, the specification unit 130 specifies rules constituting the second rule set in such a way as to decrease a difference between the first inference result and the second inference result while limiting a quantity of rules constituting the second rule set.

The output unit 140 outputs a specified second rule set.

In the operation described above, the specification unit 130 uses a configuration providing a function relating to the calculation unit 110 according to the first example embodiment or the second example embodiment. In other words, the specification unit 130 uses a rule or a rule set, and an importance thereof. Accordingly, the specification unit 130 may use a configuration corresponding to the output unit 120 in addition to the calculation unit 110.

An operation of the inference system 101 will be described in detail by use of an optimization problem.

In the following description, the first rule set is a rule set L. In other words, the rule set L is an original rule set. The second rule set is a rule subset L'. In other words, the rule subset L' is a rule set remaining after a rule set is excluded from the original rule set. The third rule set is a rule subset L". In other words, the rule subset L" is a rule set being an exclusion target. The starting state is an observation O. The ending state is a query Q. The first inference result is P(Q|O,L). The second inference result is P(Q|O,L'). The difference is $D_L(L',O,Q)$.

Then, the specification unit 130 uses the rule set L, the observation O, the query Q, and a hyper-parameter ε. The hyper-parameter ε is a parameter indicating a range of a difference in a constraint. In other words, the hyper-parameter ε is a threshold value for the difference.

Then, the specification unit 130 specifies the rule subset L' as a solution to an optimization problem 1 presented below.

[Optimization Problem 1]

Input: the observation O, the query Q, the rule set L, and the hyper-parameter ε

Optimization problem:

minimize Card(L')

subject to $|D_L(L',O,Q)| \le \varepsilon$

Output: the rule subset L'

Specifically, the specification unit 130 specifies a rule subset L' with a minimum number of rules F in a following constraint. The constraint is that an absolute value of a difference between a probability P of the query Q under the rule subset L' and the observation O, and a probability P of the query Q under the rule set L and the observation O is equal to or less than the hyper-parameter ε. In other words, the specification unit 130 specifies a rule subset L' with a minimum number of rules F (Card(L')) out of rule subsets L' with differences $D_L(L',O,Q)$ being equal to or less than the hyper-parameter ε. Alternatively, the specification unit 130 specifies a rule F constituting the aforementioned rule subset L'.

The optimization problem 1 described above may be defined by use of the excluded rule subset L". In that case, the optimization problem 1 becomes as follows.

[Different Form of Optimization Problem]

Input: the observation O, the query Q, the rule set L, and the hyper-parameter c Optimization problem:

minimize Card(L")

subject to $|D_L(L',O,Q)| \ge \varepsilon$

Output: the rule subset L"

The specification unit 130 and the output unit 140 in this case are as follows.

The specification unit 130 sets, as a second rule set, a rule set derived by excluding a third rule set being a subset of a first rule set from rules constituting the first rule set. Then, the specification unit 130 sets, as a first inference result, a result of inferring a probability that an ending state holds based on a starting state and the first rule set. Then, the specification unit 130 sets, as a second inference result, a result of inferring a probability that the same ending state as above holds based on the same starting state as above and the second rule set. Then, the specification unit 130 specifies rules constituting the third rule set in such a way as to increase a difference between the first inference result and the second inference result while limiting a quantity of the rules constituting the third rule set.

The output unit 140 outputs a specified third rule set.

[Description of Effects]

Effects of the third example embodiment will be described.

In addition to an effect of presenting a basis of inference to a user, the third example embodiment provides an effect of specifying a rule subset L' with a less number of rules F.

The reason is that the specification unit 130 according to the third example embodiment specifies a rule subset L' minimizing a number of rules F in the rule subset L' under a constraint that a value of a difference $D_L(L',O,Q)$ is kept to a hyper-parameter ε or less. In other words, the specification unit 130 is able to extract a rule F having a high influence on a probability P(Q|O,L') of a query Q under an observation O.

Further, the specification unit 130 according to the third example embodiment specifies the rule subset L' under the constraint that a value of the difference $D_L(L',O,Q)$ is kept to the hyper-parameter ε or less. Accordingly, the probability P(Q|O,L') of the query Q with the specified rule subset L', according to the third example embodiment, deviates by no more than the hyper-parameter ε from a probability P(Q|O, L) of the query Q using a rule set L. In other words, the third example embodiment is able to output a rule subset L' holding down fluctuation of the probability P of the query Q.

Fourth Example Embodiment

[Description of Configuration]

Next, a fourth example embodiment of the present invention will be described. A configuration and an operation according to the fourth example embodiment includes a configuration similar to and executes an operation similar to those according to the third example embodiment except for an optimization problem described below. Accordingly, an operation unique to the present example embodiment will be described, and a description similar to that according to the third example embodiment is omitted as appropriate.

A specification unit 130 according to the fourth example embodiment uses a hyper-parameter C in place of the hyper-parameter ε. The hyper-parameter C is a parameter indicating a range of a number of rules F in a constraint. Specifically, the hyper-parameter C is a threshold value for the number of rules F.

Then, the specification unit 130 specifies a rule subset L' as a solution to an optimization problem 2 presented below.

[Optimization Problem 2]

Input: an observation O, a query Q, a rule set L, and a hyper-parameter C

Optimization problem:

minimize $D_L(L',O,Q)$ subject to $Card(L') \leq C$

Output: a rule subset L'

Specifically, the specification unit 130 next specifies a rule subset L' minimizing a difference in a constraint. The constraint is that a number of rules F in the rule subset L' (Card(L')) is equal to or less than a hyper-parameter C. In other words, the specification unit 130 specifies a rule subset L' minimizing a difference $D_L(L',O,Q)$ out of rule subsets L' with the number of rules F (Card(L')) being equal to or less than the hyper-parameter C. Alternatively, the specification unit 130 specifies a rule F constituting the aforementioned rule subset L'.

The optimization problem 2 described above may be defined by use of an excluded rule subset L". In that case, the optimization problem 2 becomes as follows.

[Different Form of Optimization Problem 2]

Input: the observation O, the query Q, the rule set L, and the hyper-parameter C Optimization problem:

maximize $D_L(L',O,Q)$ subject to $Card(L'') \leq C$

Output: the rule subset L"

Note that the specification unit 130 and the output unit 140 in this case are also similar to those according to the third example embodiment.

[Description of Effects]

Effects of the fourth example embodiment will be described.

In addition to an effect of presenting a basis of inference to a user, the fourth example embodiment provides an effect of being capable of specifying a rule subset L' with a less number of rules F.

The reason is that the specification unit 130 according to the fourth example embodiment specifies a rule subset L' minimizing a value of a difference $D_L(L',O,Q)$ under a constraint that a number of elements (rules F) in the rule subset L' (Card(L')) is kept to a hyper-parameter C or less. In other words, the specification unit 130 is able to extract a rule F having a high influence on a probability $P(Q|O,L')$ of a query Q under an observation O.

Further, the specification unit 130 according to the fourth example embodiment specifies a rule subset L' minimizing a value of the difference $D_L(L',O,Q)$ under the constraint that a value of the number of elements in the rule subset L' (Card(L')) is kept to the hyper-parameter C or less. Accordingly, the probability $P(Q|O,L')$ of the query Q with the specified rule subset L', according to the fourth example embodiment, becomes a rule subset L' with a minimum deviation from a probability $P(Q|O,L)$ of the query Q inferred by use of a rule set L under the constraint. Thus, the specification unit 130 according to the fourth example embodiment guarantees that the probability $P(Q|O,L')$ of the query Q with the rule subset L' does not greatly deviate from the probability $P(Q|O,L)$ of the query Q when inferred by use of the rule set L.

Detailed Operation Example

Next, an example of a detailed operation according to the example embodiments of the present invention will be described with reference to drawings. The following description is provided by use of the third example embodiment. However, this operation example is not limited to the third example embodiment.

In the description of this operation example, it is assumed that the inference system 101 solves the optimization problem 1 by use of a greedy algorithm. Specifically, in the following description, the specification unit 130 excludes one rule F at a time from a rule set L and sets, as an optimum solution, a rule subset L' minimizing a number of rules F (Card(L')) while satisfying a constraint.

The above does not limit a method used by the specification unit 130 to the greedy algorithm. For example, the specification unit 130 may repeat an operation of decreasing a plurality of rules F. Alternatively, the specification unit 130 may exclude all of a plurality of rules F at a time in a single operation in such a way as to minimize the number of rules F under the constraint.

In the following description, there are a plurality of rule subsets L'. Accordingly, rule subsets L' are distinguished by adding an index i (i=1, ..., n, where n is a natural number). A rule subset L' derived by excluding one rule F from a rule set L is denoted as $L_1$. A rule subset L' derived by excluding one rule F from the rule subset $L_1$ is denoted as $L_2$. The rule set L is denoted as $L_0$.

It is assumed that, when a rule subset derived by excluding a rule $F_j$ from a rule subset $L_i$ is denoted as $L_{i+1}$, the relation is expressed as follows.

$$L_{i+1} = L_i \setminus \{F_j\}$$

Furthermore, a difference "$D_{Li}(L_{i+1},O,Q)$" between a probability $P(Q|O,L_i)$ of a query Q with a rule subset $L_i$ and a probability $P(Q|O,L_{i+1})$ of the query Q with a rule subset $L_{i+1}$ is defined as follows.

$$D_{Li}(L_{i+1},O,Q) := P(Q|O,L_{i+1}) - P(Q|O,L_i) = P(Q|O, L_i \setminus \{F_j\}) - P(Q|O,L_i)$$

When the specification unit 130 excludes a rule $F_3$ n times as a rule subset L', a relation between the rule set L and a final rule subset L' is as follows.

$$L = L_0 \supseteq L_1 \supseteq \ldots \supseteq L_n = L'$$

At this time, a difference $D_L(L',O,Q)$ included in the constraint in the optimization problem 1 is expressed as Equation 2 below.

$$D_L(L', O, Q) = \sum_{i=1}^{n} D_{L_{i-1}}, (L_i, O, Q) \quad \text{[Equation 2]}$$

A specific operation will be described with reference to a drawing.

Figure 3:
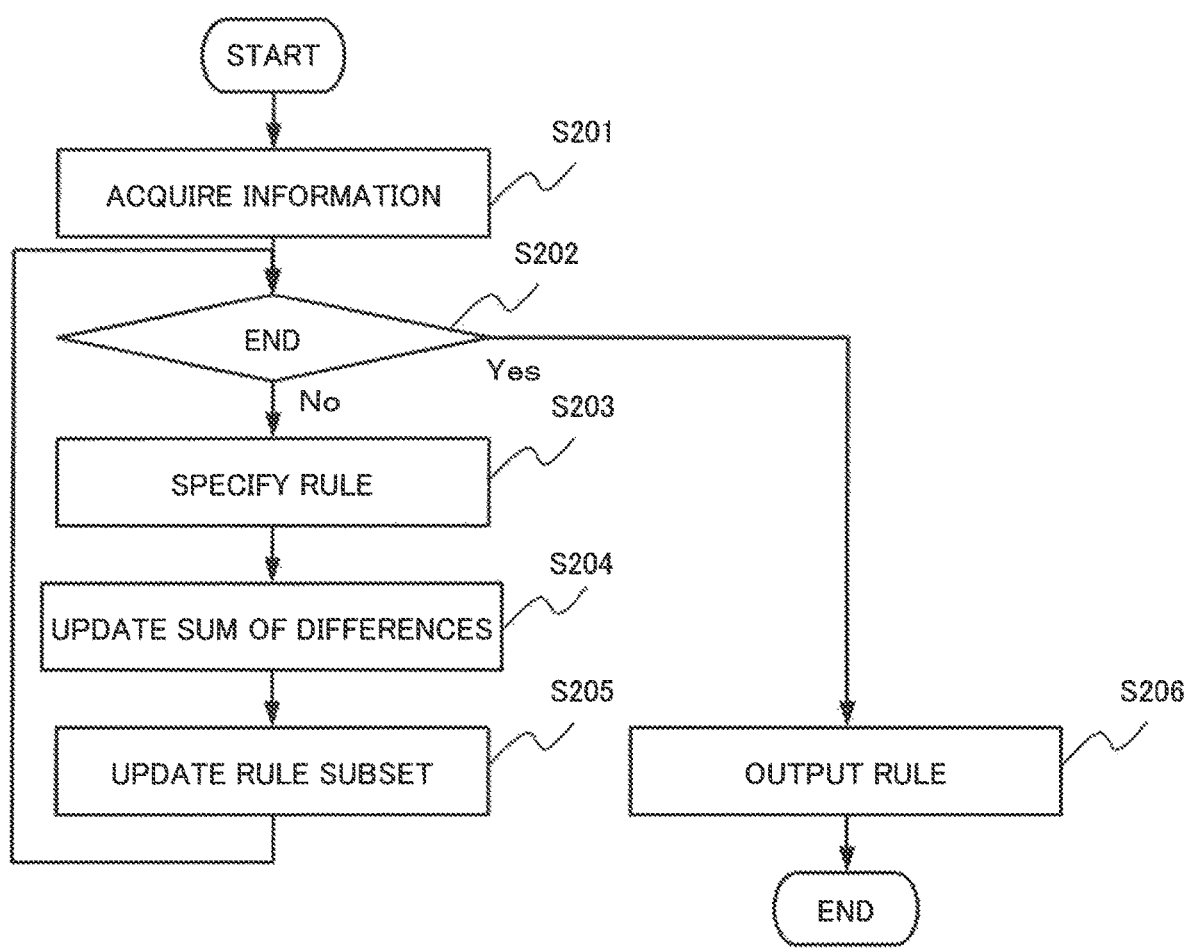
FIG. 3 is a flowchart illustrating an operation example of the inference system according to the third example embodiment.

FIG. 3 is a flowchart illustrating an operation example of the inference system 101 according to the third example embodiment.

The specification unit 130 acquires information (a rule set L, an observation O, a query Q, and a hyper-parameter ε) (Step S201).

Prior to a next operation, the specification unit 130 may execute an operation of initializing data used in the operation, such as a variable. For example, the specification unit 130 excludes a rule F from the rule set L in the following operation. Accordingly, for example, the specification unit 130 sets the rule set L as an initial value of a variable used as a rule subset L' (hereinafter referred to as $L_V$). For example, the operation may be expressed as "$L_V \leftarrow L_O$."

Alternatively, the specification unit 130 may initialize a variable used as a sum of differences (hereinafter referred to as SD). For example, the operation may be expressed as "SD←0."

Next, the specification unit 130 determines whether or not the operation is ended (Step S202). A specific end condition is that the sum of differences does not become equal to or less than the hyper-parameter c by exclusion of any rule F.

The end condition is expressed as follows by use of variables.

End condition: $|D(L_V \setminus \{F_j\}, O, Q) + SD| > \varepsilon \, (F_j \in L_V)$ When the operation is not ended (No in Step S202), the specification unit 130 specifies a rule $F_j$ exclusion of which minimizes the sum of differences (Step S203). The sum of differences in this case is "$|D(L_V \setminus \{F_j\}, O, Q) + SD|$." The specification unit 130 may add magnitude of a difference $[D(L_V \setminus \{F_j\}, O, Q)]$ to a determination criterion, in addition to the sum of differences.

Next, the specification unit 130 updates the sum of differences (Step S204). For example, the specification unit 130 executes "SD←$D(L_V \setminus \{F_j\}, O, Q)$+SD."

Then, the specification unit 130 excludes the rule $F_j$ specified in Step S203 from the rule subset $L_V$ and sets the resulting subset as a new rule subset $L_V$. In other words, the specification unit 130 updates the rule subset $L_V$ by excluding the specified rule $F_j$ (Step S205). For example, the specification unit 130 executes "$L_V \leftarrow L_V \setminus \{F_j\}$."

Then, the specification unit 130 returns to Step S202 and determines whether or not the operation is ended. The specification unit 130 repeats the aforementioned operation until the end condition is satisfied.

When the operation is ended (Yes in Step S202), the specification unit 130 sets a rule subset $L_V$ at that point in time as a final rule subset L' (L'←$L_V$) and transmits the final rule subset L' to the output unit 140.

The output rule subset L' is a rule subset L' specified by the specification unit 130. Further, a rule F constituting the rule subset L' is a specified rule F.

The output unit 140 outputs the rule subset L' received from the specification unit 130, that is, a set of the rule F specified by the specification unit 130 (Step S206).

(Description by Use of Data)

Next, a detailed operation will be described by use of specific data.

FIG. 8 is a diagram illustrating an example of a rule set L used in the following description of the detailed operation. As illustrated in FIG. 8, the rule set L includes the following four rules F (a rule $F_1$, a rule $F_2$, a rule $F_3$, and a rule $F_4$):

$F_1$=Run→Burn fat,
$F_2$=Burn fat→Slim,
$F_3$=Burn fat→Starve, and
$F_4$=Slim→Get healthy.

An observation O is "Run." In other words, the rule $F_1$ is a rule F including the observation O. Further, a query Q is "Get healthy." In other words, the rule $F_4$ is a rule F including the query Q. Since a probability P in MLN is used as a probability P used in the following description, each rule F is given a weight w.

Figure 9:
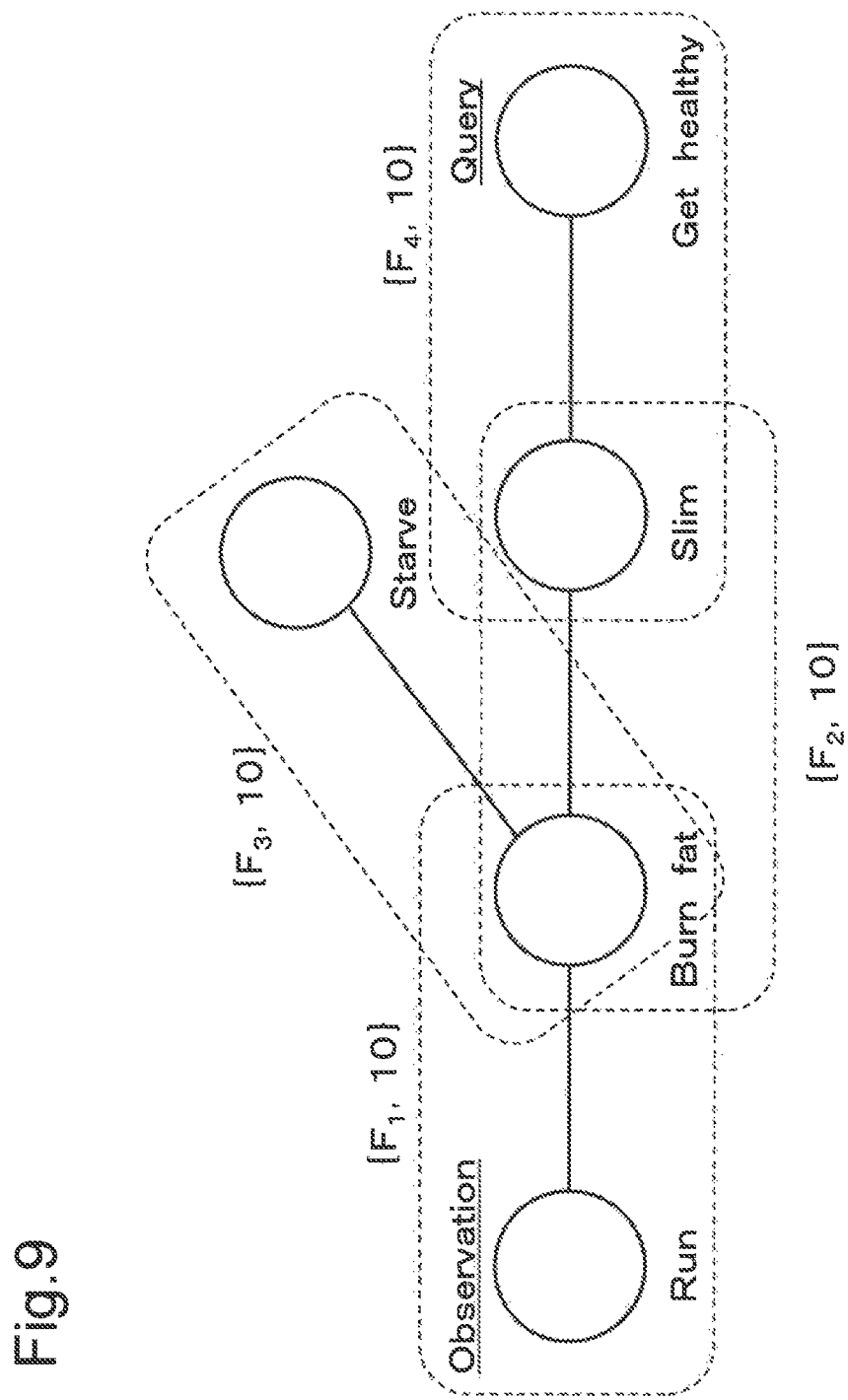
FIG. 9 is a diagram illustrating an example of a graph of the rule set illustrated in FIG. 8.

FIG. 9 is a diagram illustrating an example of a graph of the rule set L illustrated in FIG. 8. FIG. 9 uses a graph structure similar to MLN. Specifically, similarly to FIG. 4, FIG. 9 graphs the rule set L by use of setting each predicate as a node and connecting predicates appearing in the same rule F by an edge.

Furthermore, in the following description, a constraint is "a rule F including the observation O and a rule F including the query Q are not considered as exclusion targets." In other words, the rule $F_1$ and the rule $F_4$ are removed from exclusion targets. A hyper-parameter c is set to "0.30000."

First, the specification unit 130 acquires the aforementioned data (Step S201). Additionally, the specification unit 130 initializes variables (rule subset $L_V$←rule set L, SD←0).

As a reference of the following description, a probability P of the query Q under the rule set L and the observation O is presented below.

$P(Q|O, \{F_1, F_2, F_3, F_4\})$=0.99995

Since the specification unit 130 does not exclude the rule $F_1$ including the observation O and the rule $F_4$ including the query Q, the specification unit 130 calculates probabilities P of the query Q when the rule $F_2$ and the rule $F_3$ are excluded, respectively. Each probability P is as follows.

$P(Q|O, \{F_1, F_2, F_4\})$=0.99995

$P(Q|O, \{F_1, F_3, F_4\})$=0.64799

A difference between the probability P in the case of excluding the rule $F_2$ and the original probability P is "0.35196." The value is greater than the hyper-parameter ε. However, a difference between the probability P in the case of excluding the rule $F_3$ and the original probability P is "0.00000." The value is less than the hyper-parameter ε. Then, in this case, a value of SD is 0. In other words, the end condition $|D(L_V \setminus \{F_3\}, O, Q) + SD|$ is 0 and is less than the hyper-parameter ε. Accordingly, the specification unit 130 determines that the operation is not ended (No in Step S202).

The specification unit 130 specifies the rule $F_3$ exclusion of which makes a smaller probability P difference (Step S203).

The probability P in the case of excluding the rule $F_2$ is less than the probability P in the case of excluding the rule $F_3$. In other words, an amount of change in the probability P in the case of excluding the rule $F_2$ is greater than an amount of change in the probability P in the case of excluding the rule $F_3$. Accordingly, the rule $F_2$ is a rule F with a higher importance than the rule $F_3$. In other words, the specification unit 130 specifies a rule F with a lower importance.

The specification unit 130 updates the sum of differences (SD) (Step S204). Specifically, the specification unit 130 executes "SD←SD+0.00000=0.00000."

Then, the specification unit 130 updates the rule subset $L_V$ (Step S205). The rule subset $L_V$ after the update is $\{F_1, F_2, F_4\}$.

Next, the specification unit 130 determines whether or not the operation is ended (Step S202).

Specifically, the specification unit 130 calculates a probability P of the query Q in a case of further excluding the rule F2. A probability P in this case is as follows.

$$P(Q|O, \{F1, F4\}) = 0.64799$$

A sum of differences (SD) of probabilities P in this case becomes "0.35196." The difference is greater than the hyperparameter ε (0.30000). Accordingly, the specification unit 130 determines that the operation is ended (Yes in Step S202).

The specification unit 130 specifies the current rule subset $L_V\{F_1, F_2, F_4\}$ as a final rule subset L'. In other words, the specification unit 130 specifies the rule $F_1$, the rule $F_2$, and the rule $F_4$.

Then, the output unit 140 outputs the specified rule subset L'($\{F_1, F_2, F_4\}$) (Step S206).

Figure 10:
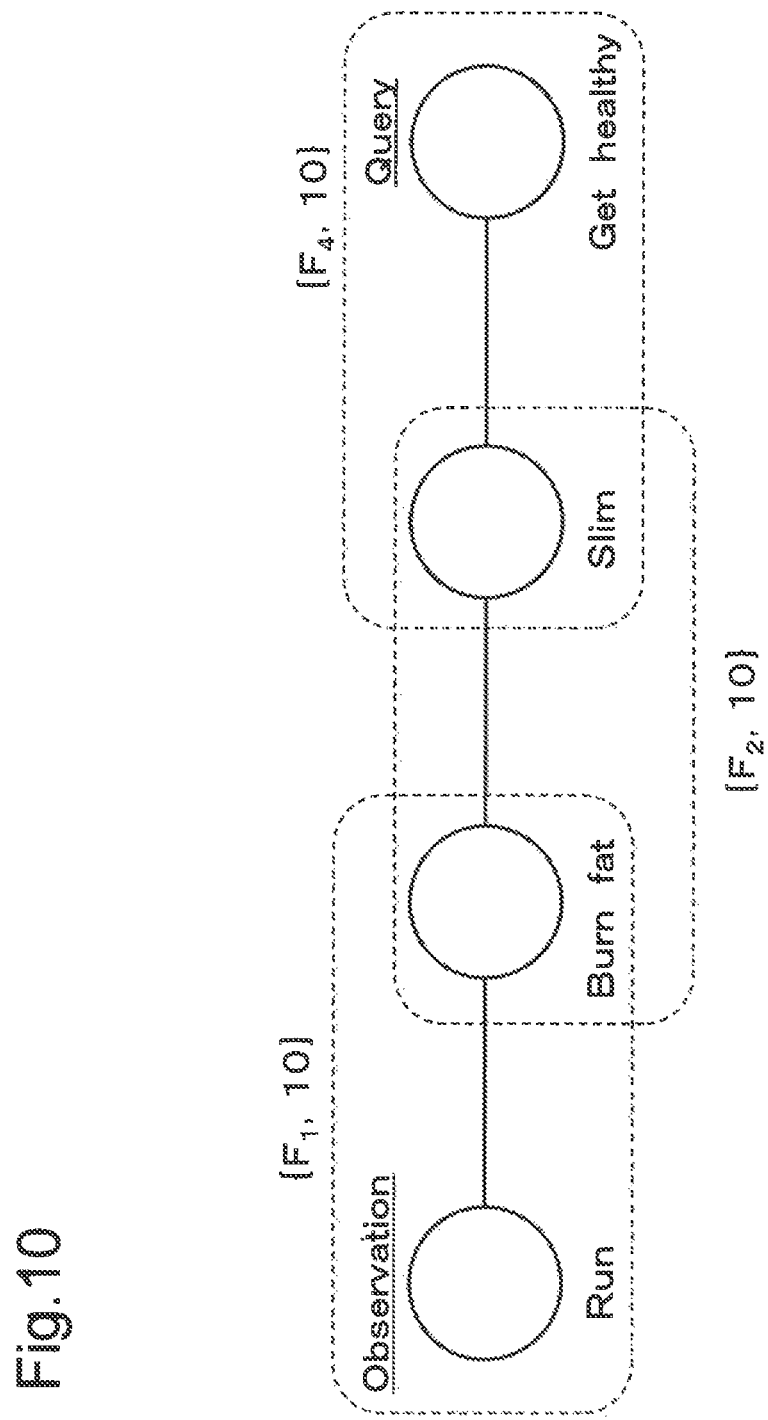
FIG. 10 is a diagram illustrating an example of a rule subset specified in the rule set in FIG. 9.

FIG. 10 is a diagram illustrating an example of the rule subset L' specified in the rule set L in FIG. 9.

As a reference, a case of applying the related invention using MLN to the rule set L illustrated in FIGS. 8 and 9 will be described below. The related invention uses a weight w. However, the rule $F_2$ and the rule $F_3$ have the same weight w. Accordingly, the related invention is not able to determine which of the rule $F_2$ or the rule $F_3$ is to be excluded. Accordingly, the related invention outputs the original rule set L($\{F_1, F_2, F_3, F_4\}$) or a rule subset L'($\{F_1, F_4\}$) derived by excluding the rule $F_2$ and the $F_3$.

Figure 11:
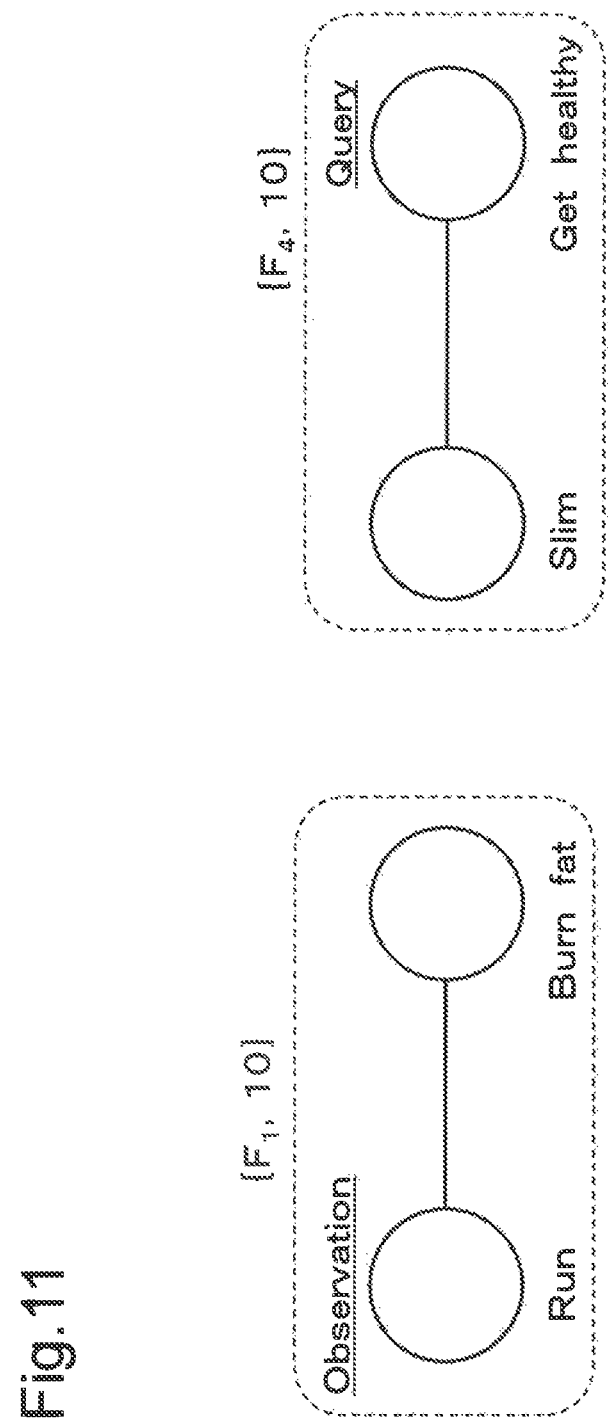
FIG. 11 is a diagram illustrating an example of a rule subset output by a related invention.

FIG. 11 is a diagram illustrating an example of the rule subset L'($\{F_1, F_4\}$) output by the related invention. Note that the rule set L($\{F_1, F_2, F_3, F_4\}$) is illustrated in FIG. 9.

However, when the rule set L is output, the output result is a set of redundant rules including the rule $F_3$. Further, as described above, a probability P for the rule subset L'($\{F_1, F_4\}$) illustrated in FIG. 11 is greatly different from that for the rule set L.

Thus, the related invention using MLN is not able to output a suitable rule subset L'.

Other Data Examples

Furthermore, operation results with data different from the above will be described. A rule set L and a rule subset L' as a specific result in the specification unit 130 are presented in the following description.

Figure 12:
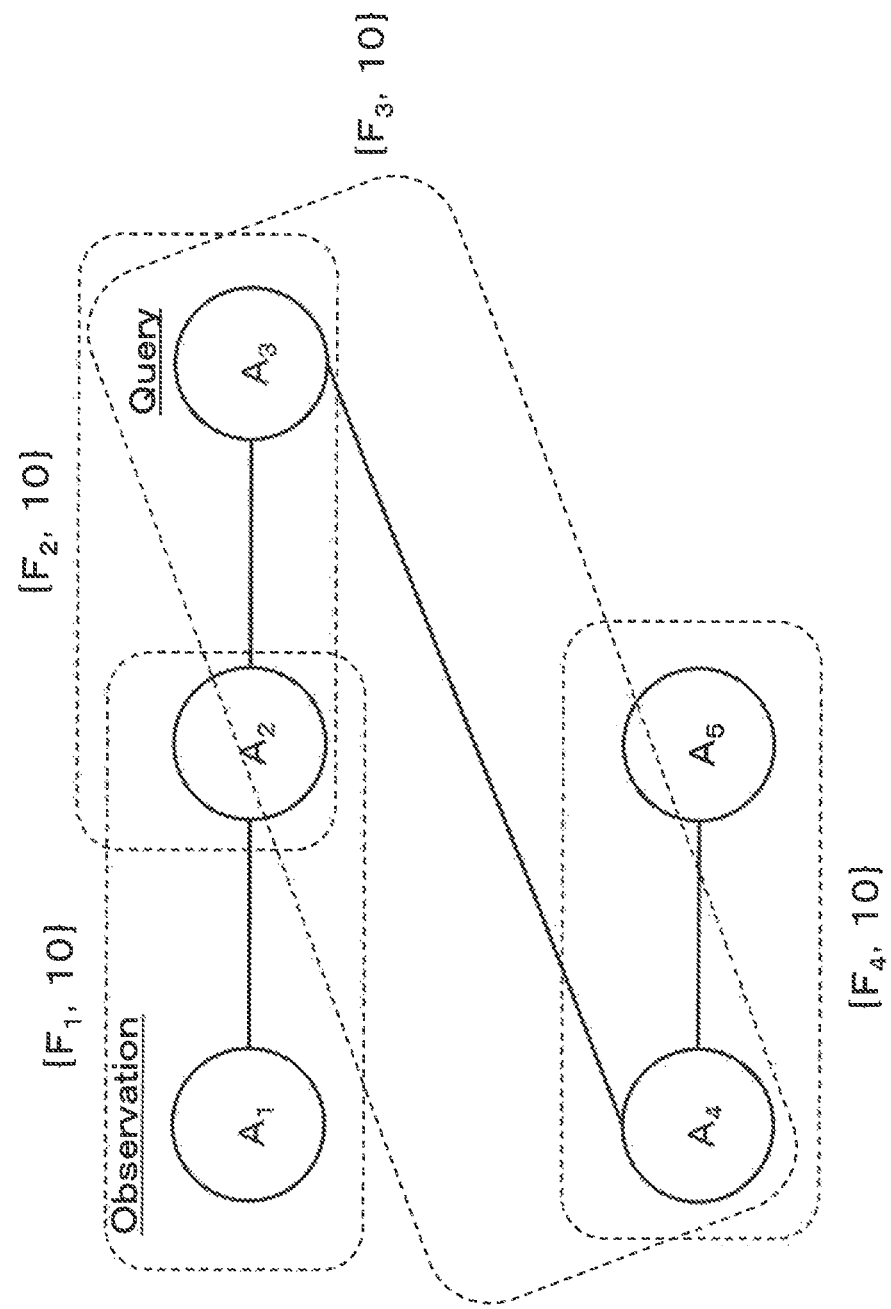
FIG. 12 is a diagram illustrating a rule set in a first data example.

FIG. 12 is a diagram illustrating a rule set L in a first data example. An observation O is a predicate $A_1$. A query Q is a predicate $A_3$. Rules F constituting the rule set L are as follows.
$F_1: A_1 \rightarrow A_2$ (weight: 10)
$F_2: A_2 \rightarrow A_3$ (weight: 10)
$F_3: A_3 \rightarrow A_4$ (weight: 10)
$F_4: A_4 \rightarrow A_5$ (weight: 10)
A probability P(Q|O,L) in this case is 0.99995.

Figure 13:
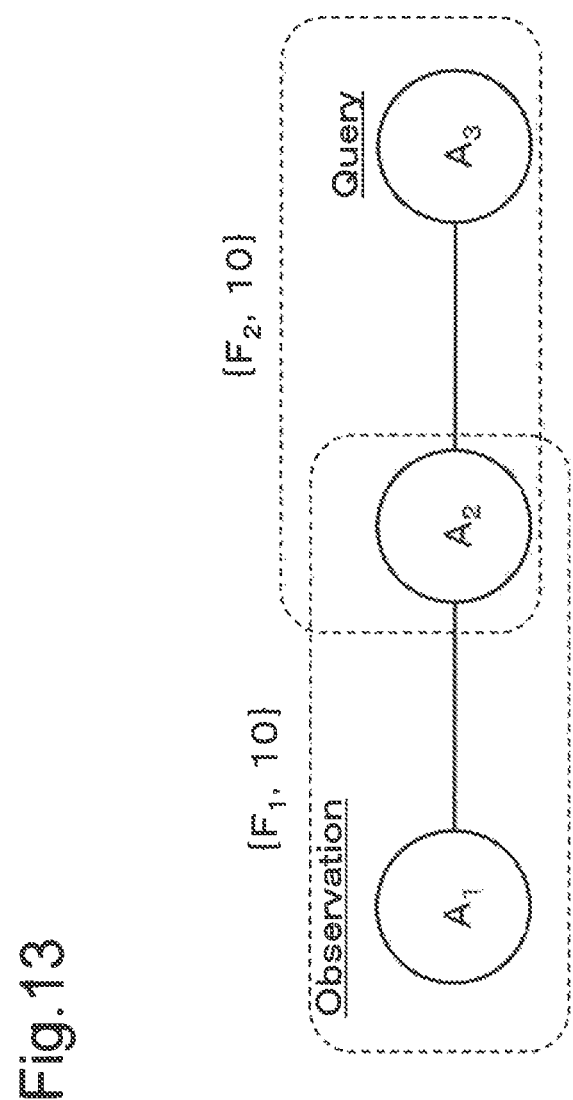
FIG. 13 is a diagram illustrating a rule subset specified based on the first data example.

FIG. 13 is a diagram illustrating a rule subset L' specified based on the first data example illustrated in FIG. 12. A probability P(Q|O,L') with the rule subset L' is 0.99995. A probability P(Q|O,L') in a case of further excluding the rule $F_1$ becomes 0.64799. A probability P(Q|O,L') in a case of excluding the rule $F_1$ from the rule set L, that is, a case of the rule subset L' being $\{F_2, F_3, F_4\}$, becomes 0.37801.

Thus, the inference system 101 is able to exclude a rule F not influencing the probability P of the query Q (a rule F with a low importance) and specify a rule F with a higher importance.

Figure 14:
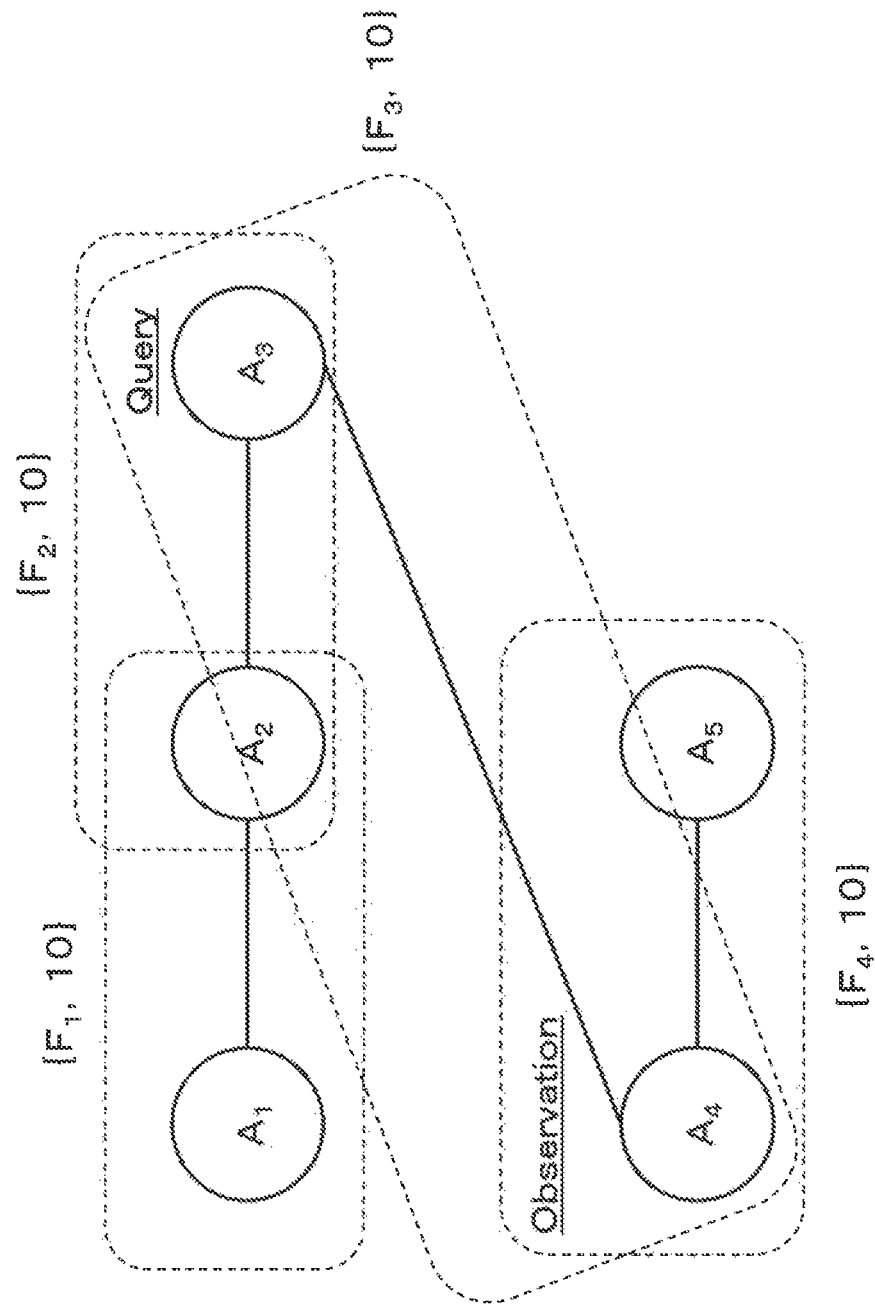
FIG. 14 is a diagram illustrating a rule set in a second data example.

FIG. 14 is a diagram illustrating a rule set L in a second data example. An observation O is a predicate $A_4$. A query Q is a predicate $A_3$. Rules F of the rule set L are the same as those in FIG. 12. A probability P(Q|O,L) in this case is 0.75498.

Figure 15:
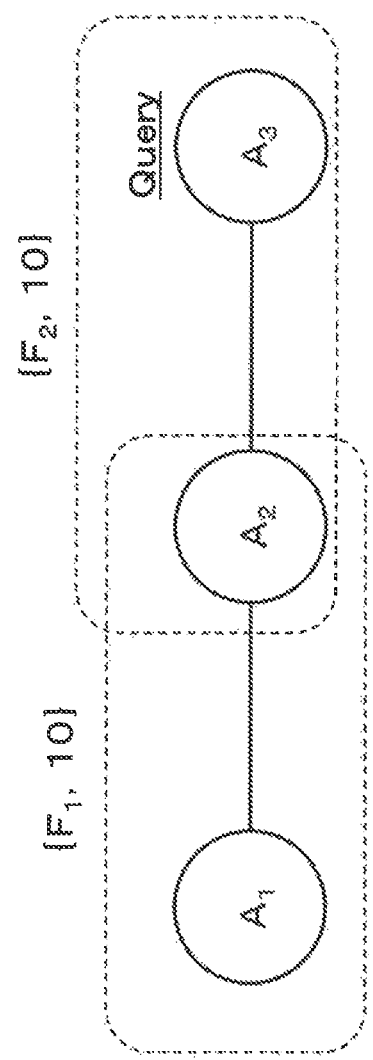
FIG. 15 is a diagram illustrating a rule subset specified based on the second data example.

FIG. 15 is a diagram illustrating a rule subset L' specified based on the second data example illustrated in FIG. 14. A probability P(Q|O,L') with the rule subset L' is 0.75498. A probability P(Q|O,L') in a case of excluding the rule $F_1$, that is, a case of the rule subset L' being $\{F_2, F_3, F_4\}$, becomes 0.64799.

Thus, the inference system 101 is able to exclude a rule F weakly influencing the probability P of the query Q even when the rule F includes the observation O, and specify a rule F with a higher importance.

Figure 16:
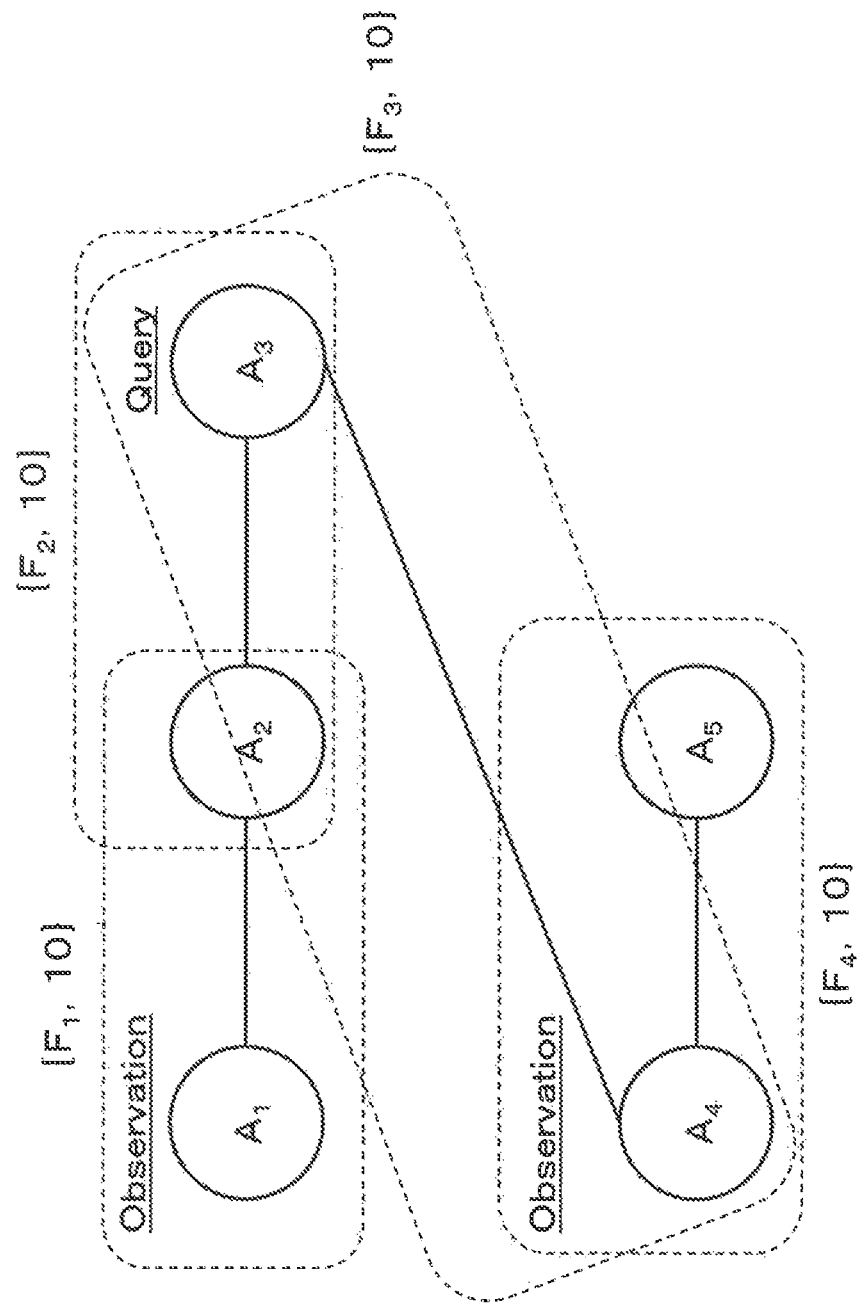
FIG. 16 is a diagram illustrating a rule set in a third data example.

FIG. 16 is a diagram illustrating a rule set L in a third data example. Observations O are a predicate $A_1$ and a predicate $A_4$. A query Q is a predicate $A_3$. Rules F in the rule set L are the same as those in FIG. 12. A probability P(Q|O,L) in this case is 0.99995.

Figure 17:
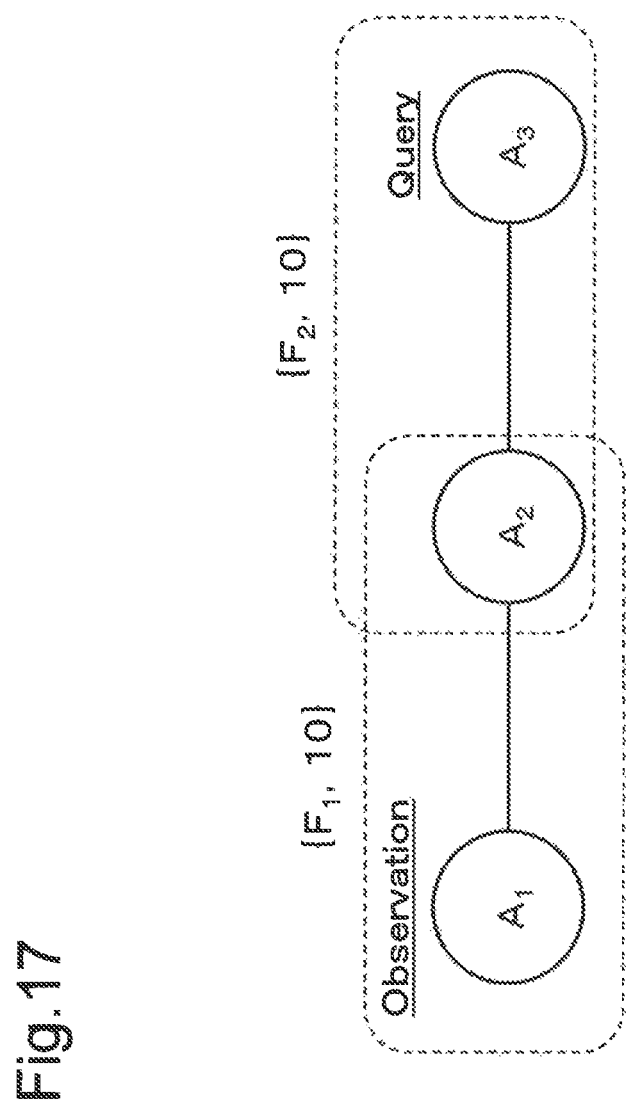
FIG. 17 is a diagram illustrating a rule subset specified based on the third data example.

FIG. 17 is a diagram illustrating a rule subset L' specified based on the third data example illustrated in FIG. 16. A probability P(Q|O,L') with the rule subset L' is 0.99995. A probability P(Q|O,L') in a case of excluding the rule $F_1$, that is, a case of the rule subset L' being $\{F_2, F_3, F_4\}$ becomes 0.64799.

Thus, the inference system 101 is able to exclude a rule F weakly influencing the probability P of the query Q even when there are a plurality of rules F including observations O, and specify a rule F with a higher importance.

Figure 18:
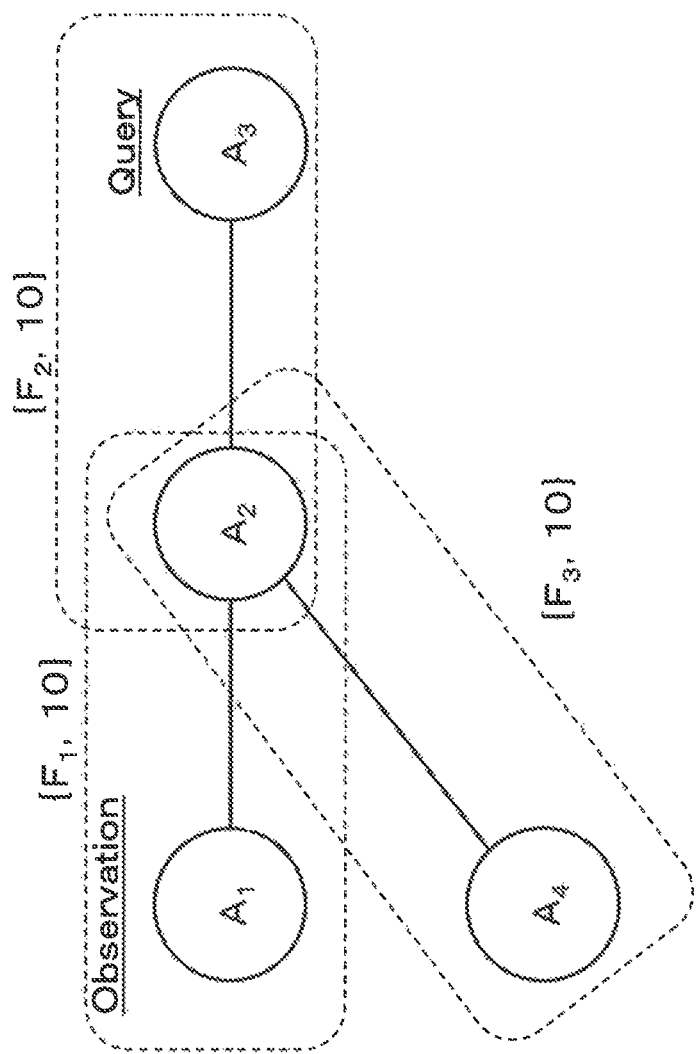
FIG. 18 is a diagram illustrating a rule set in a fourth data example.

FIG. 18 is a diagram illustrating a rule set L in a fourth data example. An observation O is a predicate $A_1$. A query Q is a predicate $A_3$. Rules F in the rule set L are as follows.
$F_1: A_1 \rightarrow A_2$ weight: 10)
$F_2: A_2 \rightarrow A_3$ (weight: 10)
$F_3: A_4 \rightarrow A_2$ (weight: 10)
A probability P(Q|O,L) in this case is 0.99995.

Figure 19:
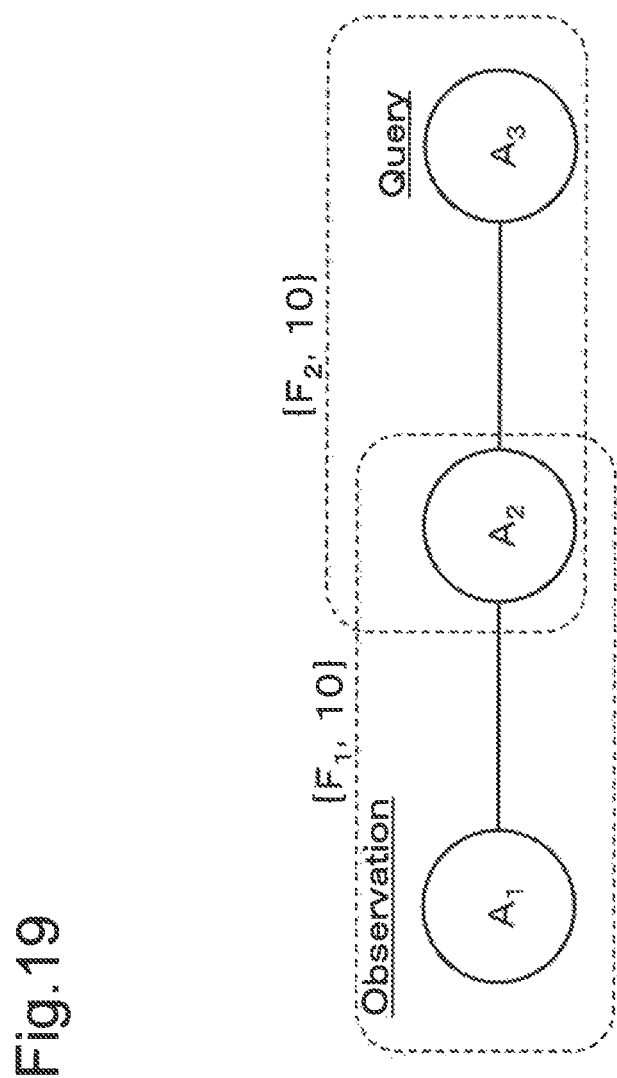
FIG. 19 is a diagram illustrating a rule subset specified based on the fourth data example.

FIG. 19 is a diagram illustrating a rule subset L' specified based on the fourth data example illustrated in FIG. 18. A probability P(Q|O,L') with the rule subset L' is 0.99995. A probability P(Q|O,L') in a case of excluding the rule $F_1$, that is, a case of the rule subset L' being $\{F_2, F_3\}$, becomes 0.64799.

Thus, the inference system 101 is able to preferentially specify a rule F including the observation O even when there are a plurality of rules F in similar connection states.

Figure 20:
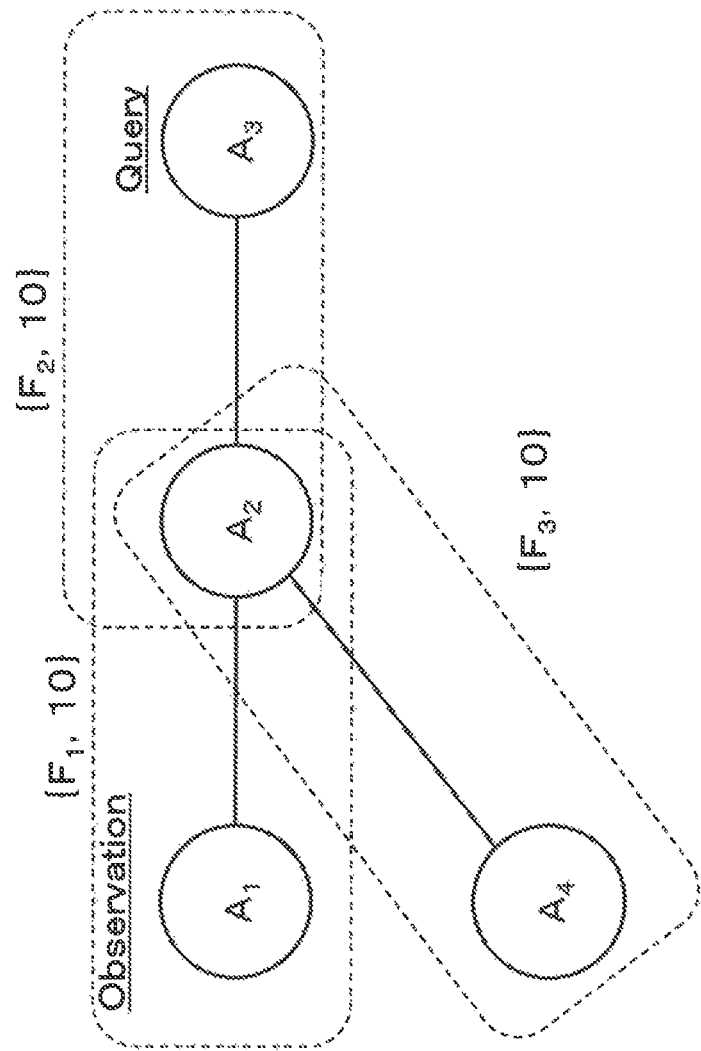
FIG. 20 is a diagram illustrating a rule set in a fifth data example.

FIG. 20 is a diagram illustrating a rule set L in a fifth data example. An observation O is a predicate $A_1$. A query Q is a predicate $A_3$. Rules F in the rule set L are as follows.
$F_1: A_1 \rightarrow A_2$ (weight: 10)
$F_2: A_2 \rightarrow A_3$ (weight: 10)
$F_3: A_2 \rightarrow A_4$ (weight: 10)
A probability P(Q|O,L) in this case is 0.99995.

Figure 21:
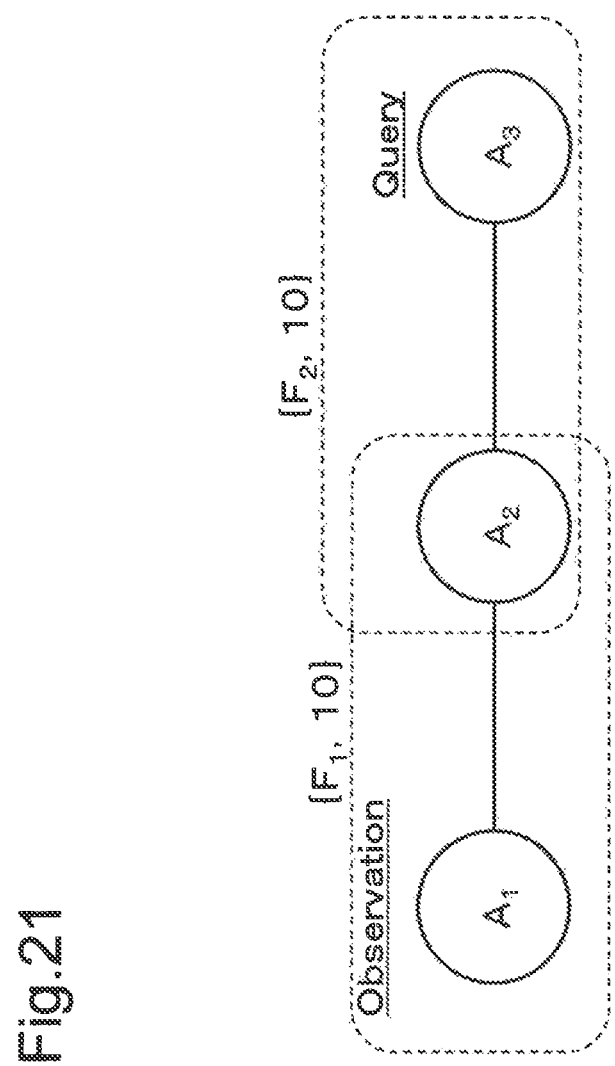
FIG. 21 is a diagram illustrating a rule subset specified based on the fifth data example.

FIG. 21 is a diagram illustrating a rule subset L' specified based on the fifth data example illustrated in FIG. 20. A probability P(Q|O,L') with the rule subset L' is 0.99995. A probability P(Q|O,L') in a case of excluding the rule $F_1$, that is, a case of the rule subset L' being $\{F_2, F_j\}$ becomes 0.60999.

Thus, the inference system 101 is able to exclude a rule F not influencing the probability P of the query Q and specify a rule F with a higher importance.

Figure 22:
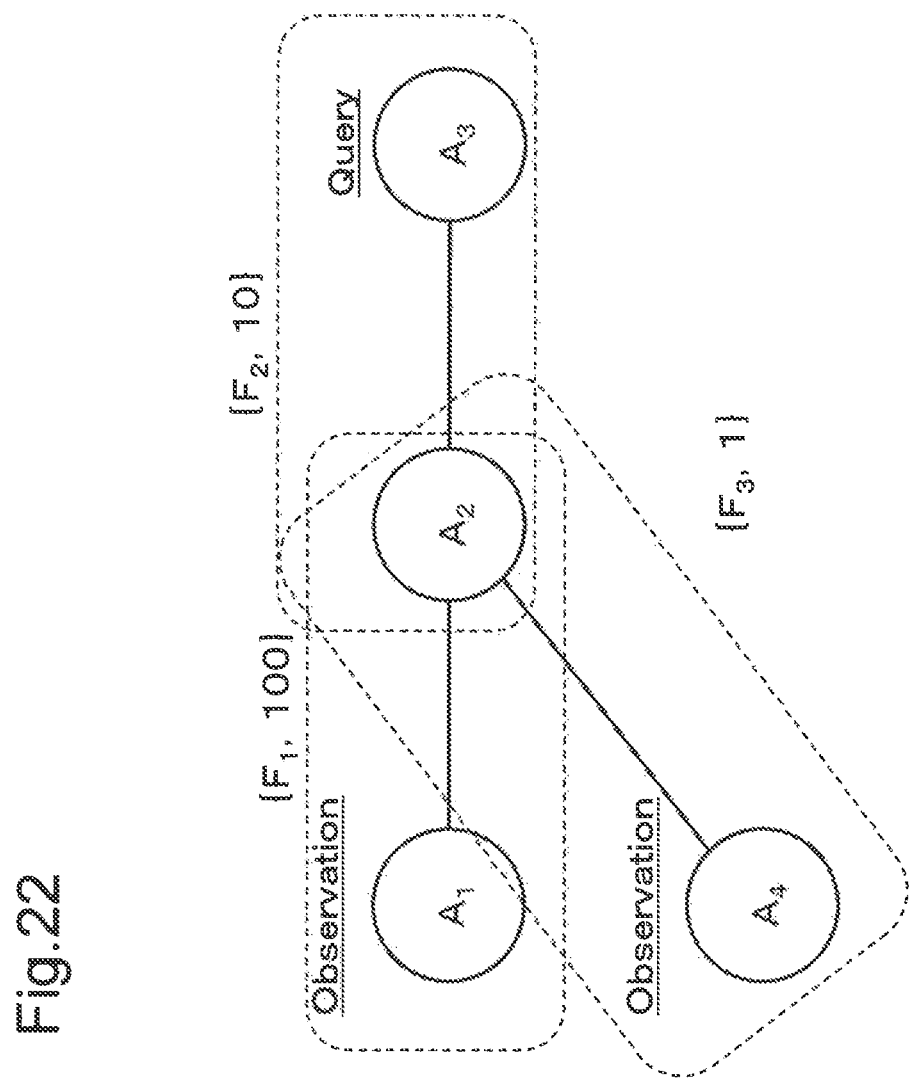
FIG. 22 is a diagram illustrating a rule set in a sixth data example.

FIG. 22 is a diagram illustrating a rule set L in a sixth data example. Observations O are a predicate $A_1$ and a predicate $A_4$. A query Q is a predicate $A_3$. Rules F in the rule set L are as follows.
$F_1$: $A_1 \rightarrow A_2$ (weight: 100)
$F_2$: $A_2 \rightarrow A_3$ (weight: 10)
$F_3$: $A_4 \rightarrow A_2$ (weight: 1)
A probability P(Q|O,L) in this case is 0.99995.

Figure 23:
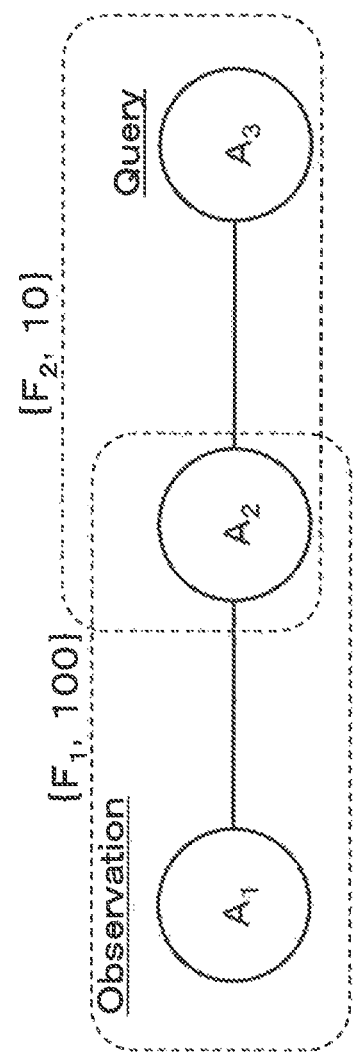
FIG. 23 is a diagram illustrating a rule subset specified based on the sixth data example.

FIG. 23 is a diagram illustrating a rule subset L' specified based on the sixth data example illustrated in FIG. 22. A probability P(Q|O,L') with the rule subset L' is 0.99995. A probability P(Q|O,L') in a case of excluding the rule $F_1$, that is, a case of the rule subset L' being $\{F_2, F_j\}$ becomes 0.82297.

Thus, the inference system 101 is able to exclude a rule F including an observation O weakly influencing the probability P of the query Q even when there are a plurality of rules F including observations O connected in a same manner, and specify a rule F with a higher importance.

Figure 24:
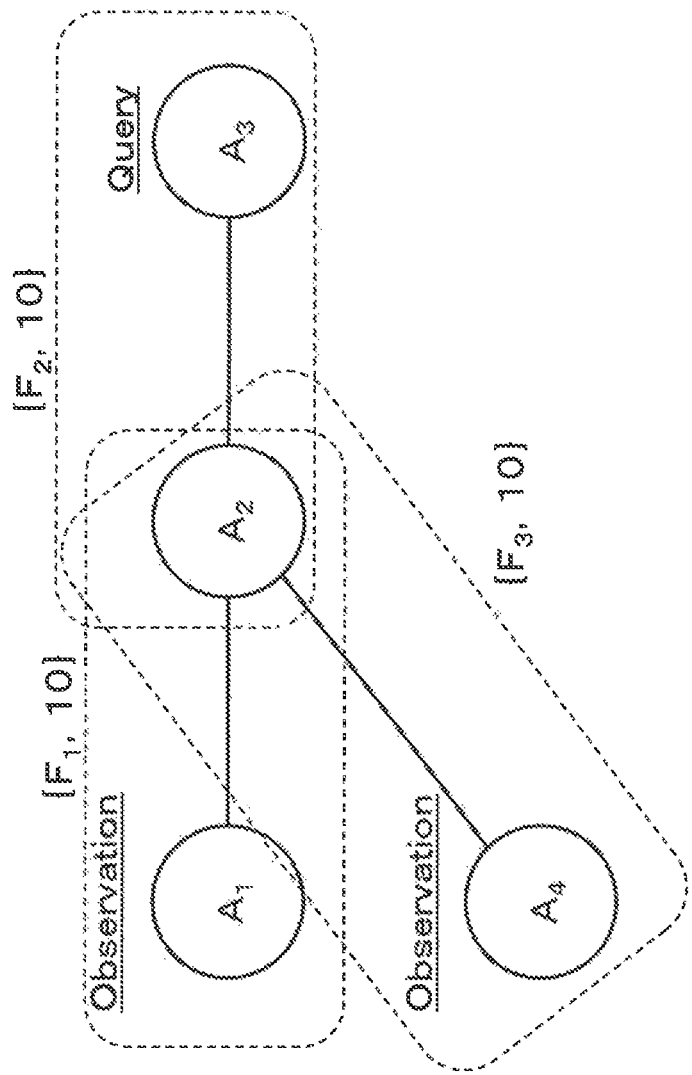
FIG. 24 is a diagram illustrating a rule set in a seventh data example.

FIG. 24 is a diagram illustrating a rule set L in a seventh data example. Observations O are a predicate $A_1$ and a predicate $A_4$. A query Q is a predicate $A_3$. Rules F in the rule set L are as follows.
$F_1$: $A_1 \rightarrow A_2$ (weight: 10)
$F_2$: $A_2 \rightarrow A_3$ (weight: 10)
$F_3$: $A_4 \rightarrow A_2$ (weight: 10)
A probability P(Q|O,L) in this case is 0.99995.

Figure 25:
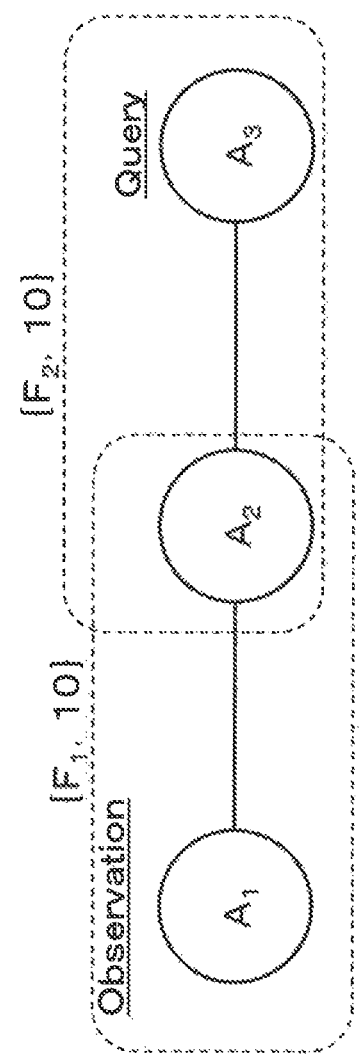
FIG. 25 is a diagram illustrating a rule subset specified based on the seventh data example.

FIG. 25 is a diagram illustrating a rule subset L' specified based on the seventh data example illustrated in FIG. 24. A probability P(Q|O,L') with the rule subset L' is 0.99995. A probability P(Q|O,L') in a case of excluding the rule $F_1$, that is, a case of the rule subset L' being $\{F_2, F_j\}$ becomes 0.75300.

Thus, the inference system 101 is able to exclude a rule F including an observation O weakly influencing the probability P of the query Q even when there are a plurality of rules F including observations O with the same weight w, and specify a rule F with a higher importance.

<Hardware Configuration>

A hardware configuration of the inference system 100 and the inference system 101 will be described.

The inference system 100 and the inference system 101 described above are configured as follows.

Each component of the inference system 100 and the inference system 101 is provided in part or in whole by use of general-purpose or dedicated circuitry, a processor or the like, or a combination thereof. Each component may be configured by use of a single chip or may be configured by use of a plurality of chips connected through a bus. Each component in the inference system 100 and the inference system 101 may be provided in part or in whole by use of a combination of the aforementioned circuitry or the like, and a program.

When each component in the inference system 100 and the inference system 101 is provided in part or in whole by use of a plurality of information processing devices, or a plurality of pieces of circuitry or the like, the plurality of information processing devices, or the plurality of pieces of circuitry or the like may be placed in a concentrated manner or may be placed in a distributed manner. For example, the information processing devices, or the pieces of circuitry or the like may be provided in a form of each being connected through a communication network, such as a client and server system, a cloud computing system or the like.

Further, a plurality of components in the inference system 100 and the inference system 101 may be configured with a single piece of hardware.

Further, each of the inference system 100 and the inference system 101 may be provided as a computer device including a central processing unit (CPU), a read only memory (ROM), and a random access memory (RAM). Each of the inference system 100 and the inference system 101 may be provided as a computer device including an input/output circuit (IOC) and a network interface circuit (NIC) in addition to the aforementioned configuration.

Figure 26:
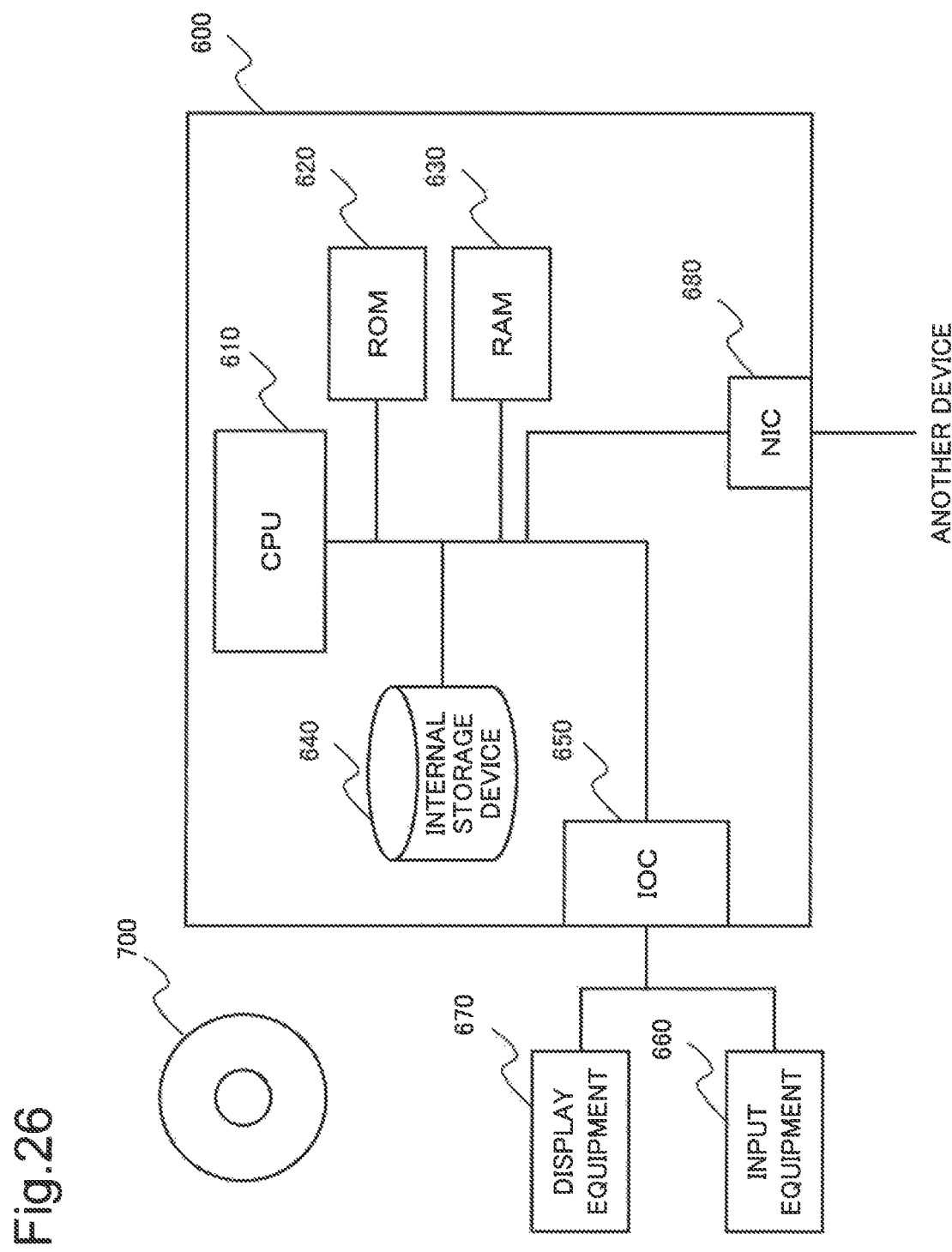
FIG. 26 is a block diagram illustrating a configuration of an information processing device being an example of a hardware configuration of an inference system.

FIG. 26 is a block diagram illustrating a configuration of an information processing device 600 being an example of a hardware configuration of the inference system 100 and the inference system 101.

The information processing device 600 includes a CPU 610, a ROM 620, a RAM 630, an internal storage device 640, an IOC 650, and a NIC 680, and constitutes a computer device.

The CPU 610 reads a program from the ROM 620. Then, based on the read program, the CPU 610 controls the RAM 630, the internal storage device 640, the IOC 650, and the NIC 680. Then, the computer including the CPU 610 controls the configurations and provides the respective functions as the calculation unit 110 and the output unit 120 that are illustrated in FIG. 1. Alternatively, the computer including the CPU 610 controls the configurations and provides the respective functions as the specification unit 130 and the output unit 140 that are illustrated in FIG. 2.

When providing the respective functions, the CPU 610 may use the RAM 630 or the internal storage device 640 as a temporary storage medium of the program.

Further, the CPU 610 may read a program included in a storage medium 700 storing the program in a computer-readable manner, by use of an unillustrated storage medium reader. Alternatively, the CPU 610 may receive a program from an unillustrated external device through the NIC 680, save the program into the RAM 630, and operate based on the saved program.

The ROM 620 stores a program executed by the CPU 610 and fixed data. For example, the ROM 620 is a programmable-ROM (P-ROM) or a flash ROM.

The RAM 630 temporarily stores a program executed by the CPU 610 and data. For example, the RAM 630 is a dynamic-RAM (D-RAM).

The internal storage device 640 stores data and a program that are saved by the information processing device 600 for a long term. Further, the internal storage device 640 may operate as a temporary storage device of the CPU 610. For example, the internal storage device 640 is a hard disk device, a magneto-optical disk device, a solid state drive (SSD), or a disk array device.

The ROM 620 and the internal storage device 640 are non-transitory storage media. On the other hand, the RAM 630 is a transitory storage medium. Then, the CPU 610 is able to operate in accordance with a program stored in the ROM 620, the internal storage device 640, or the RAM 630. In other words, the CPU 610 is able to operate using a non-transitory storage medium or a transitory storage medium.

The IOC 650 mediates data between the CPU 610, and input equipment 660 and display equipment 670. For example, the IOC 650 is an IO interface card or a universal serial bus (USB) card. Additionally, the IOC 650 may use not only a wired line such as USB but also a wireless line.

The input equipment 660 is equipment for receiving an input instruction from an operator of the information processing device 600. For example, the input equipment 660 is a keyboard, a mouse, or a touch panel.

The display equipment 670 is equipment displaying information to an operator of the information processing device 600. For example, the display equipment 670 is a liquid crystal display. The display equipment 670 may operate as the output unit 120 or the output unit 140.

The NIC 680 relays a data exchange with an unillustrated external device through a network. For example, the NIC 680 is a local area network (LAN) card. Additionally, the NIC 680 may use not only a wired line but also a wireless line.

The thus configured information processing device 600 is able to provide effects similar to those provided by the inference system 100 and the inference system 101.

The reason is that the CPU 610 in the information processing device 600 is able to provide functions similar to those provided by the inference system 100 and the inference system 101, in accordance with a program.

The whole or part of the exemplary embodiments disclosed above can be described as, but not limited to, the following supplementary notes.

[Supplementary Note 1]

An inference system inferring a probability that an ending state holds based on a starting state and a rule set, the inference system includes:

a memory; and at least one processor coupled to the memory, the processor performing operations, the operations includes:

when a rule set derived by excluding one rule from rules constituting a first rule set is set as a second rule set, a probability that the ending state holds based on the starting state and the first rule set is set as a first inference result, and a probability that the ending state holds based on the starting state and the second rule set is set as a second inference result, for each of the excluded rule, calculating an importance being an indicator indicating magnitude of a difference between the first inference result and the second inference result; and for each of the excluded rule, outputting the rule and the importance of the rule, being associated with each other.

[Supplementary Note 2]

The inference system according to supplementary note 1, wherein the operations further comprises outputting the rule with a higher value of the importance than the rule with a lower value of the importance preferentially.

[Supplementary Note 3]

The inference system according to supplementary note 1 or 2, wherein the operations further comprises outputting the rule, the importance of the rule, and a weight value previously calculated for the rule, being associated with one another.

[Supplementary Note 4]

An inference system inferring a probability that an ending state holds based on a starting state and a rule set, the inference system includes:

a memory; and at least one processor coupled to the memory, the processor performing operations, the operations includes:

when a rule set derived by excluding a third rule set being a subset of a first rule set from rules constituting the first rule set is set as a second rule set, a probability that the ending state holds based on the starting state and the first rule set is set as a first inference result, and a probability that the ending state holds based on the starting state and the second rule set is set as a second inference result, with respect to the third rule set, calculating an importance being an indicator indicating magnitude of a difference between the first inference result and the second inference result; and for each of the excluded third rule set, outputting the third rule set and the importance of the third rule set, being associated with each other.

[Supplementary Note 5]

An inference system inferring a probability that an ending state holds based on a starting state and a rule set, the inference system includes:

a memory; and at least one processor coupled to the memory, the processor performing operations, the operations includes:

when a rule set derived by excluding a third rule set being a subset of a first rule set from rules constituting the first rule set is set as a second rule set, a result of inferring a probability that an ending state holds based on a starting state and the first rule set is set as a first inference result, and a result of inferring a probability that an ending state holds based on the starting state and the second rule set is set as a second inference result, specifying a rule constituting the second rule set in such a way as to decrease a difference between the first inference result and the second inference result while limiting a quantity of rules constituting the second rule set; and outputting the second rule set specified.

[Supplementary Note 6]

The inference system according to supplementary note 5, wherein the operations further comprises specifying a rule constituting the second rule set in such a way as to satisfy a constraint that the difference is kept to a threshold value or less, and also to decrease a number of rules constituting the second rule set.

[Supplementary Note 7]

The inference system according to supplementary note 5, wherein the operations further comprises specifying a rule constituting the second rule set in such a way as to satisfy a constraint that a quantity of rules constituting the second rule set is kept to a threshold value or less, and also to decrease the difference.

[Supplementary Note 8]

An inference system inferring a probability that an ending state holds based on a starting state and a rule set, the inference system includes:

a memory; and at least one processor coupled to the memory, the processor performing operations, the operations includes:

when a rule set derived by excluding a third rule set being a subset of a first rule set from rules constituting the first rule set is set as a second rule set, a result of inferring a probability that an ending state holds based on the starting state and the first rule set is set as a first inference result, and a result of inferring a probability that an ending state holds based on the starting state and the second rule set is set as a second inference result, specifying a rule constituting the third rule set in such a way as to increase a difference between the first inference result and the second inference result while limiting a quantity of rules constituting the third rule set; and outputting the third rule set specified.

[Supplementary Note 9]

The inference system according to supplementary note 8, wherein the operations further comprises specifying a rule constituting the third rule set in such a way as to satisfy a constraint that the difference is kept to a threshold value or more, and also to decrease a number of rules constituting the third rule set.

[Supplementary Note 10]

The inference system according to supplementary note 8, wherein the operations further comprises specifying a rule constituting the third rule set in such a way as to satisfy a constraint that a quantity of rules constituting the third rule set is kept to a threshold value or less, and also to increase the difference.

[Supplementary Note 11]

An inference method in an inference system inferring a probability that an ending state holds based on a starting state and a rule set, the method includes, by the inference system:

when a rule set derived by excluding one rule from rules constituting a first rule set is set as a second rule set, a probability that the ending state holds based on the starting state and the first rule set is set as a first inference result, and a probability that the ending state holds based on the starting state and the second rule set is set as a second inference result, for each of the excluded rule, calculating an importance being an indicator indicating magnitude of a difference between the first inference result and the second inference result; and, for each of the excluded rule, outputting the rule and the importance of the rule, being associated with each other.

[Supplementary Note 12] An inference method in an inference system inferring a probability that an ending state holds based on a starting state and a rule set, the method includes, by the inference system:

when a rule set derived by excluding a third rule set being a subset of a first rule set from rules constituting the first rule set is set as a second rule set, a probability that the ending state holds based on the starting state and the first rule set is set as a first inference result, and a probability that the ending state holds based on the starting state and the second rule set is set as a second inference result, with respect to the third rule set, calculating an importance being an indicator indicating magnitude of a difference between the first inference result and the second inference result; and, for each of the excluded third rule set, outputting the third rule set and the importance of the third rule set, being associated with each other.

[Supplementary Note 13]

An inference method in an inference system inferring a probability that an ending state holds based on a starting state and a rule set, the method includes, by an inference system:

when a rule set derived by excluding a third rule set being a subset of a first rule set from rules constituting the first rule set is set as a second rule set, a result of inferring a probability that an ending state holds based on a starting state and the first rule set is set as a first inference result, and a result of inferring a probability that an ending state holds based on the starting state and the second rule set is set as a second inference result, specifying a rule constituting the second rule set in such a way as to decrease a difference between the first inference result and the second inference result while limiting a quantity of rules constituting the second rule set; and outputting the second rule set specified.

[Supplementary Note 14]

An inference method in an inference system inferring a probability that an ending state holds based on a starting state and a rule set, the method includes, by the inference system:

when a rule set derived by excluding a third rule set being a subset of a first rule set from rules constituting the first rule set is set as a second rule set, a result of inferring a probability that an ending state holds based on the starting state and the first rule set is set as a first inference result, and a result of inferring a probability that an ending state holds based on the starting state and the second rule set is set as a second inference result, specifying a rule constituting the third rule set in such a way as to increase a difference between the first inference result and the second inference result while limiting a quantity of rules constituting the third rule set; and outputting the third rule set specified.

[Supplementary Note 15]

A non-transitory computer-readable recording medium embodying a program, the program causing a computer to perform a method in an inference system inferring a probability that an ending state holds based on a starting state and a rule set, the method includes, by the inference system:

when a rule set derived by excluding one rule from rules constituting a first rule set is set as a second rule set, a probability that the ending state holds based on the starting state and the first rule set is set as a first inference result, and a probability that the ending state holds based on the starting state and the second rule set is set as a second inference result, for each of the excluded rule, calculating an importance being an indicator indicating magnitude of a difference between the first inference result and the second inference result; and for each of the excluded rule, outputting the rule and the importance of the rule, being associated with each other.

[Supplementary Note 16]

A non-transitory computer-readable recording medium embodying a program, the program causing a computer to perform a method in an inference system inferring a probability that an ending state holds based on a starting state and a rule set, the method includes, by the inference system:

when a rule set derived by excluding a third rule set being a subset of a first rule set from rules constituting the first rule set is set as a second rule set, a probability that the ending state holds based on the starting state and the first rule set is set as a first inference result, and a probability that the ending state holds based on the starting state and the second rule set is set as a second inference result, with respect to the third rule set, calculating an importance being an indicator indicating magnitude of a difference between the first inference result and the second inference result; and for each of the excluded third rule set, outputting the third rule set and the importance of the third rule set, being associated with each other.

[Supplementary Note 17]

A non-transitory computer-readable recording medium embodying a program, the program causing a computer to perform a method in an inference system inferring a probability that an ending state holds based on a starting state and a rule set, the method includes, by the inference system:

when a rule set derived by excluding a third rule set being a subset of a first rule set from rules constituting the first rule set is set as a second rule set, a result of inferring a probability that an ending state holds based on a starting state and the first rule set is set as a first inference result, and a result of inferring a probability that an ending state holds based on the starting state and the second rule set is set as a second inference result, specifying a rule constituting the second rule set in such a way as to decrease a difference between the first inference result and the second inference result while limiting a quantity of rules constituting the second rule set; and outputting the second rule set specified.

[Supplementary Note 18]

A non-transitory computer-readable recording medium embodying a program, the program causing a computer to perform a method in an inference system inferring a probability that an ending state holds based on a starting state and a rule set, the method comprising, by the inference system:

when a rule set derived by excluding a third rule set being a subset of a first rule set from rules constituting the first rule set is set as a second rule set, a result of inferring a probability that an ending state holds based on the starting state and the first rule set is set as a first inference result, and a result of inferring a probability that an ending state holds based on the starting state and the second rule set is set as a second inference result, specifying a rule constituting the third rule set in such a way as to increase a difference between the first inference result and the second inference result while limiting a quantity of rules constituting the third rule set; and outputting the third rule set specified.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2016-050373, filed on Mar. 15, 2016, the disclosure of which is incorporated herein in its entirety by reference.

INDUSTRIAL APPLICABILITY

The present invention is applicable to a purpose of clearly describing a basis leading to an inference result derived by artificial intelligence, in supporting human intellectual work based on the artificial intelligence with a probabilistic logical inference technique placed at the core.

The present invention is widely applicable when performing inference of finding a posterior probability of a query under an observation with the observation and the query as inputs, by a probabilistic logical inference technique performing inference by defining a random variable, based on a formula, without being limited to an inference technique such as MLN or PSL.

REFERENCE SIGNS LIST

100 Inference system
101 Inference system
110 Calculation unit
120 Output unit
130 Specification unit
140 Output unit
600 Information processing device
610 CPU
620 ROM
630 RAM
640 Internal storage device
650 IOC
660 Input equipment
670 Display equipment
680 NIC
700 Storage medium

What is claimed is:

1. An inference basis presentation system presenting a basis inference inferring a probability that an ending state holds based on a starting state and a rule set, the inference basis presentation system comprising:

a memory; and at least one processor coupled to the memory, the processor performing operations, the operations comprising:

acquiring a first rule set including a starting state, an ending state and at least one rule that is connected at least one of the starting state or the ending state from a device;

setting a rule set derived by excluding one rule from rules constituting the first rule set so as to have a probability different from a probability of the first rule set, as a second rule set, setting a probability that the ending state holds based on the starting state and the first rule set, as a first inference result;

setting a probability that the ending state holds based on the starting state and the second rule set is set, as a second inference result;

for each of the excluded rule, calculating an importance being an indicator indicating magnitude of a difference between the first inference result and the second inference result; and for each of the excluded rule, outputting the rule and the importance of the rule, being associated with each other to a device operated by a user.

2. The inference system according to claim 1, wherein the operations further comprises outputting the rule with a higher value of the importance than the rule with a lower value of the importance preferentially.

3. The inference system according to claim 1, wherein the operations further comprises outputting the rule, the importance of the rule, and a weight value previously calculated for the rule, being associated with one another.

4. The inference basis presentation system according to claim 1, wherein the operation further comprises:

specifying a rule constituting the second rule by automatically computing an optimization problem, the optimization problem consisting of an objective function to minimize the number of the rule and constraints indicating the difference in probability for each of the subsets of rule.

5. The inference basis presentation system according to claim 1, wherein the operation further comprises:

specifying a rule constituting the second rule by automatically computing an optimization problem, the optimization problem consisting of objective function to minimize difference in probability for each of the subsets of rules and constraints indicating a threshold the number of rules.

6. An inference basis presentation method in an inference system presenting a basis inference inferring a probability that an ending state holds based on a starting state and a rule set, the method comprising, by the inference system:

acquiring a first rule set including a starting state, an ending state and at least one rule that is connected at least one of the starting state or the ending state from a device;

setting a rule set derived by excluding one rule from rules constituting the first rule set so as to have a probability different from a probability of the first rule set, as is set as a second rule set, setting a probability that the ending state holds based on the starting state and the first rule set, as a first inference result;

setting a probability that the ending state holds based on the starting state and the second rule set is set as a second inference result, for each of the excluded rule, calculating an importance being an indicator indicating magnitude of a difference between the first inference result and the second inference result; and, for each of the excluded rule, outputting the rule and the importance of the rule, being associated with each other to a device operated by a user.

* * * * *